INVENTORS
Richard Windels
Robert J. Duggan
BY
Curtis, Morris & Safford
ATTORNEYS

DATA ENTRY APPARATUS

United States Patent Office 3,368,028 Patented Feb. 6, 1968

3,368,028
DATA ENTRY APPARATUS

Richard Windels, Darien, Conn., and Robert J. Duggan, Bronx, N.Y., assignors to The Bunker-Ramo Corporation, a corporation of Delaware Filed Sept. 6, 1963, Ser. No. 307,190
33 Claims. (Cl. 178—4.1)

This invention relates to on-line or "real time" data processing apparatus. More in particular, this invention relates to equipment adapted to facilitate the transmission of messages between a plurality of remote units and a central data processor.

In an embodiment of the invention to be described hereinbelow, the remote units are conventional teletypewriters by means of which operators can transmit messages in the form of alpha-numeric pulse code signals. Such a system might be used, for example, with a supply depot or warehousing installation, the teletypewriters being used to transmit to the central data processor orders for spare parts or the like, and the data processor serving in turn to prepare the necessary documents, to update the inventory data, and to confirm the order sent from the remote teletypewriter.

Such a system must meet a number of requirements. For example, it must be arranged to assure that the messages reaching the data processor are free from error. Also, since the data processor can operate at a speed much faster than a teletypewriter, the system should be arranged to permit the processor to work independently of any teletypewriter while the operator at that teletypewriter types out the message. In addition, the system should permit immediate entry of a message from any teletypewriter, that is, there should be no "queuing" of the remote stations. The present invention meets these and other important requirements in a reliable and economical manner.

Accordingly, it is an object of this invention to provide improved means for effecting the transmission of data between a plurality of remote units and a central data processor. Other specific objects, aspects and advantages of this invention will in part be pointed out in, and in part apparent from, the following description considered together with the accompanying drawings, in which.

Figure 8A:
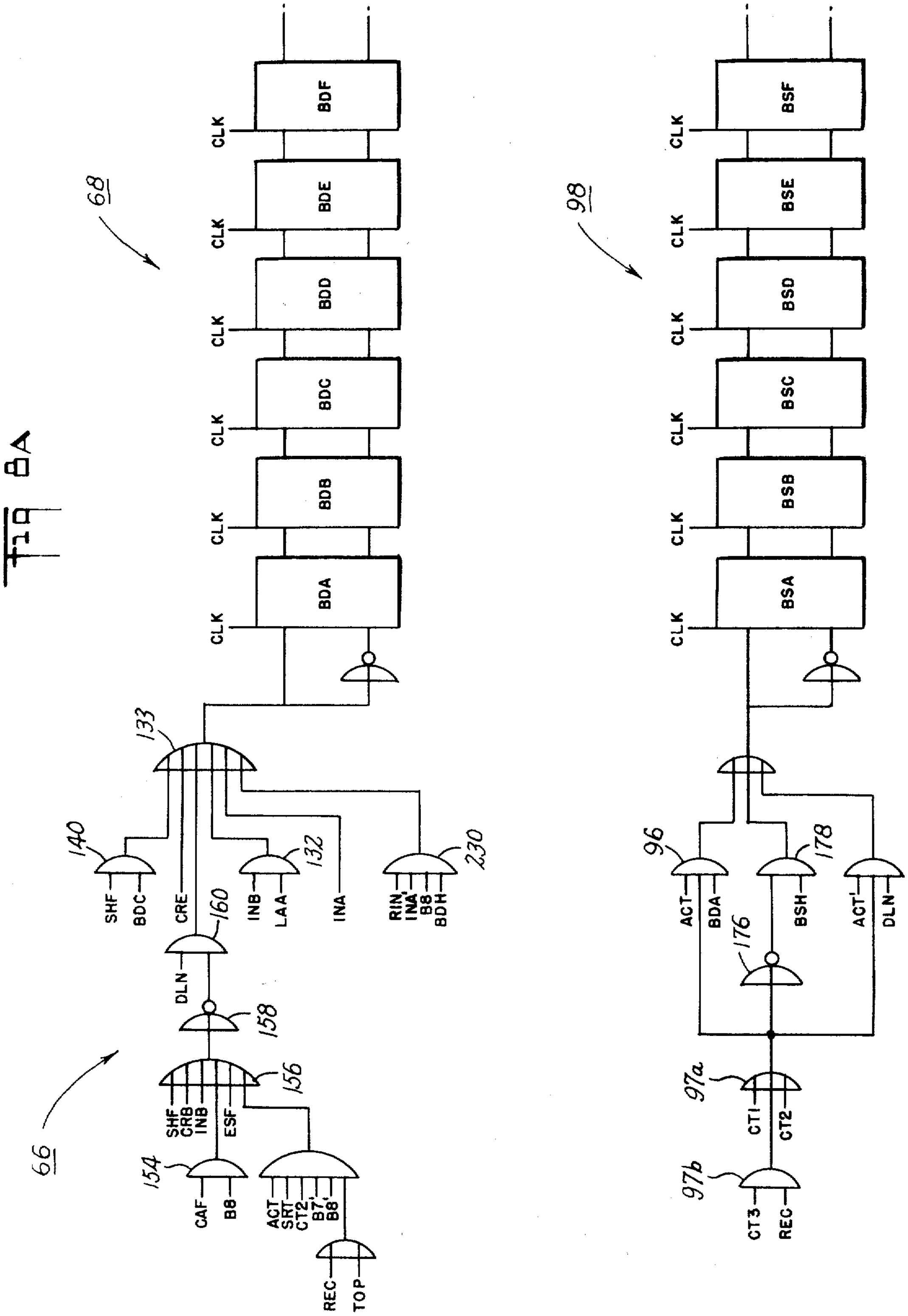
Figure 8B:
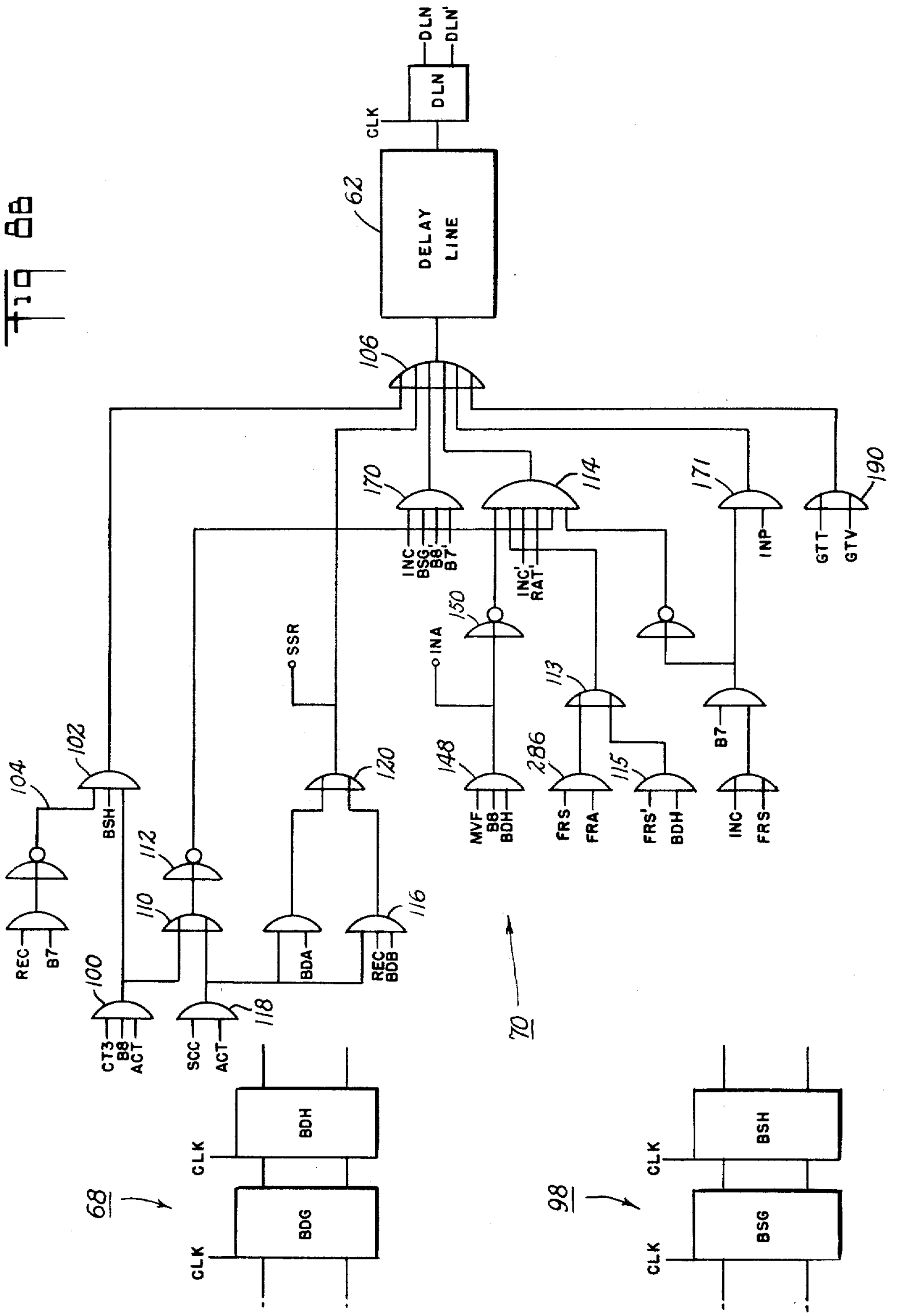

FIGURES 8A and 8B when placed side-by-side present a schematic diagram showing details of the delay line shift register and the gating control circuitry used therewith;

FIGURES 9 through 33 are schematic diagrams showing details of the logic circuitry;

FIGURES 34 through 38 are schematic diagrams showing the multiplexing circuitry for producing signals responsive only to respective delay line zones; and FIGURES 39 through 44 are schematic diagrams showing the circuitry used for transferring a message to the central data processor.

Figure 1:
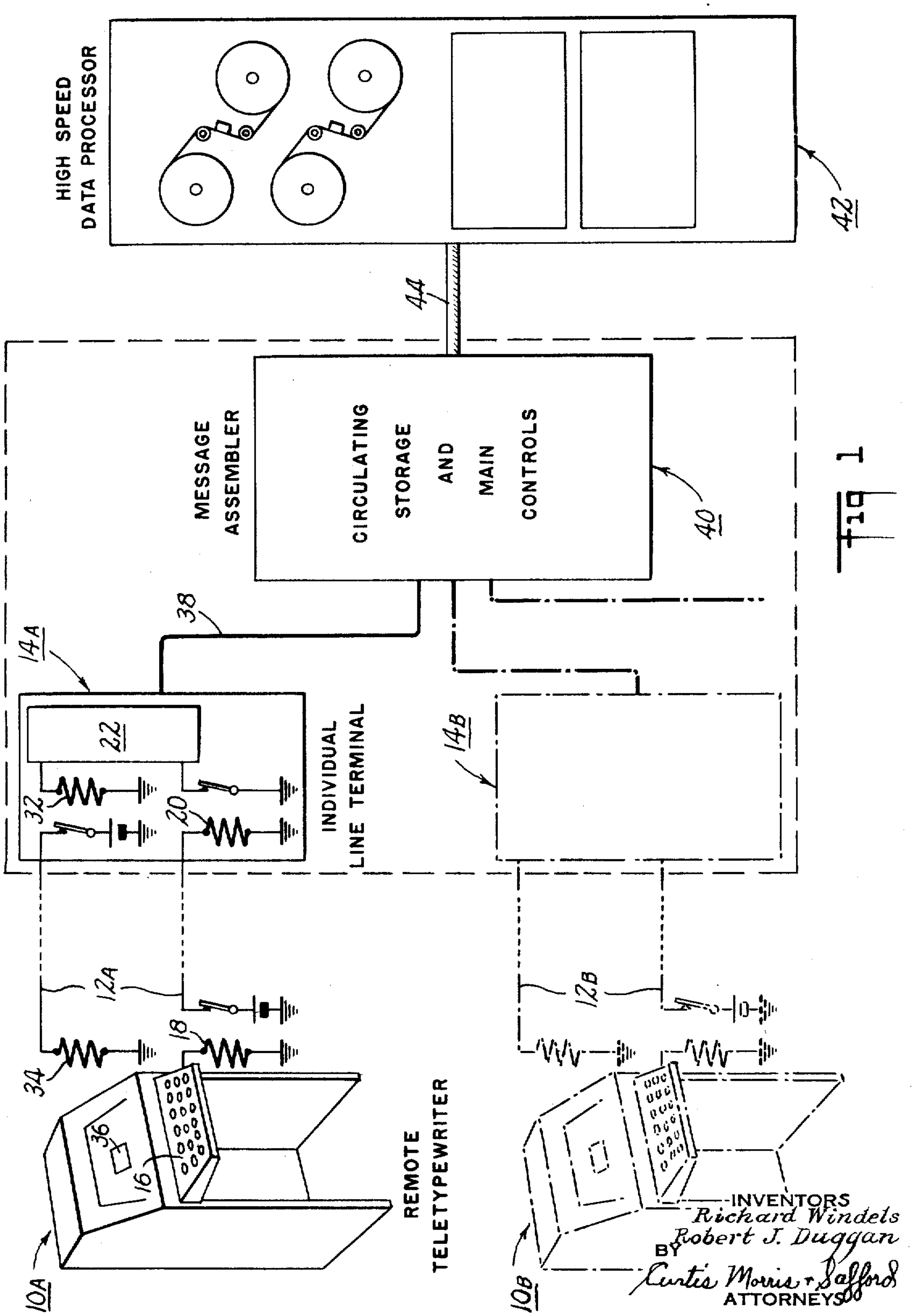
FIGURE 1 is a schematic diagram illustrating the principal components of the system.

Referring now to FIGURE 1, the system comprises a plurality of remote teletypewriters 10A, 10B, etc., e.g. of the commercial type referred to as Teletype Model 28. Each teletypewriter is connected by a corresponding full-duplex transmission line 12A, 12B, etc., to a respective line terminating unit 14A, 14B, etc. The sub-systems formed by these units and the transmission line connections are identical for each teletypewriter, and therefore only the upper set of equipment will be described in detail.

The teletypewriter 10A includes a keyboard 16 the keys of which actuate switches to produce distinctive permutation pulse code signals for each character produced by the teletypewriter. These code signals are applied to line 12A by a relay 18 which produces the usual "mark" or "space" conditions of the line. The pulse signals on the line actuate a receive relay 20 the contacts of which direct corresponding data pulses to the terminating unit circuitry generally indicated at 22.

Figure 2:
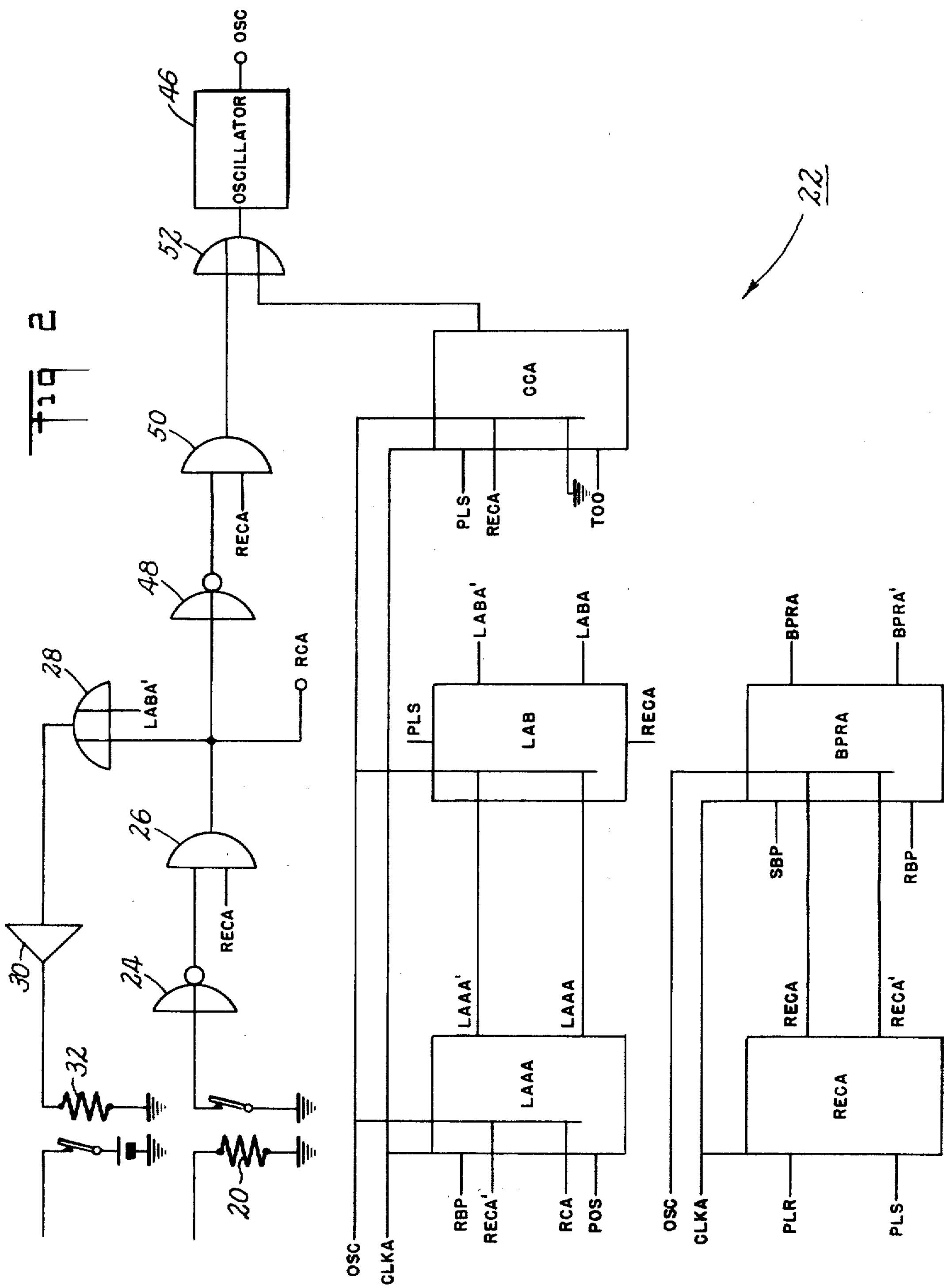
FIGURE 2 is a block diagram showing the circuitry of one of the line terminal units.

Referring now to FIGURE 2, which shows details of the terminating unit circuitry 22, each pulse received by relay 20 is directed through an inverter 24 to an AND gate 26. When the terminating unit is in its "receive" mode (as will be described), the other input RECA to gate 26 is "high" (also referred to as "logical one"), and accordingly gate 26 passes the line pulse through to an OR gate 28. The corresponding pulse at the output of gate 28 is intensified by an amplifier 30, and is fed to a send relay 32 which transmits the code signal back to the teletypewriter 10A on the other section of line 12A.

The code signals returned to the teletypewriter 10A actuate a relay 34 which controls the print mechanism 36 so as to print out the message typed on the keyboard 16. Thus the operator is enabled to determine immediately by visual inspection whether there was any error in the signals received by the terminating unit 14A, such as might be caused by lightning hitting the transmission line 12A.

By means shortly to be described, the pulse code signals rceeived by the terminating unit 14A are also retransmitted through interconnecting wiring, generally indicated at 38, to a message assembler 40, and are there placed in a temporary storage register assigned to the originating teletypewriter. The data stored in this register can be verified for correctness at any time by a special control which causes the print mechanism 36 to print out the characters stored in the temporary storage register for inspection by the operator. After a complete message has thus been assembled , and has been verified for accuracy if desired, a BID signal is sent from the message assembler 40 to the central processor 42. The normal computing operations of the processor are momentarily interrupted to permit the assembled message to be sent in over cable 44 at processor speed. If a reply is required, it is sent from from the processor to the message assembler where the data is temporarily stored and then sent on to the appropriate teletypewriter at the maximum teletypewriter operating speed.

Figure 3:
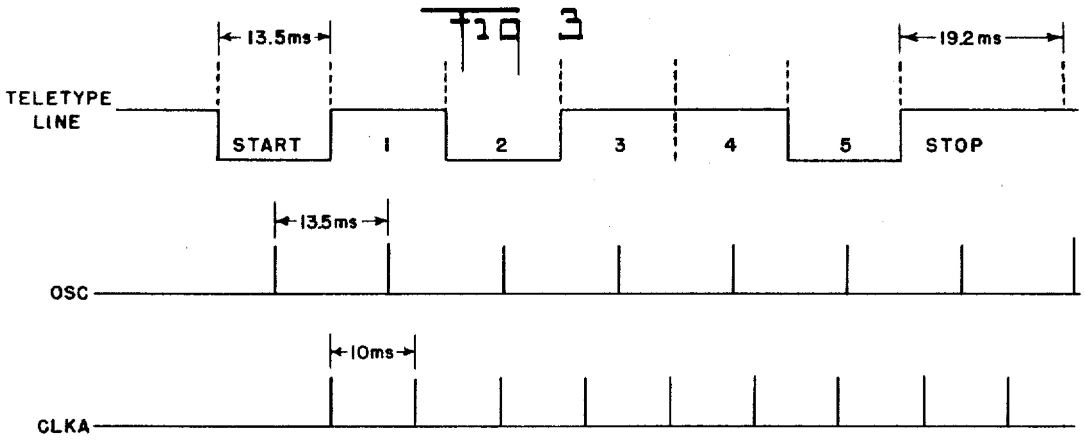
FIGURE 3 is a timing diagram showing a typical teletypewriter code signal together with associated clock pulses.

Returning now to the detailed description of the apparatus, the terminal unit 14A includes means for sampling the pulses produced by the teletypewriter 10A and for generating a corresponding series of pulses for storage in the message assembler 40. With continued reference to FIGURE 2, this sampling operation is synchronized by an oscillator 46 which is activated upon receipt of a "start" pulse developed by the teletypewriter. Referring also to FIGURE 3, it can be seen that the start pulse places the line in a "spacing" condition. This causes the output of gate 26 (RCA) to go low, and the following inverter 48 directs a high signal to an AND gate 50. Since it was assumed that the unit is in "receive" mode, the other input RECA to gate 50 also is high, and therefore this gate transmits a high signal through OR gate 52 to activate oscillator 46.

This oscillator 46 includes conventional time-delay circuitry (not shown) arranged to cause the oscillator to produce a sampling pulse at about 6.7 milliseconds after initiation of the start pulse. Therefore, as indicated in FIGURE 3, the first oscillator pulse occurs in the center of the start pulse, and subsequent oscillator pulses are spaced at the correct interval (about 13.5 milliseconds) to coincide with the centers of the received code pulses, with the exception of the stop pulse which, by arbitrary convention, lasts 1.42 times as long as the normal code pulses.

The OR gate 52 also receives the output of a flop CCA the input of which is connected to the RECA lead (now high, in the "receive" mode) and the OSC line. Thus, when the first pulse is produced by oscillator 46 upon receipt of a "start" code pulse, flop CCA sets, and its output goes high so as to maintain the oscillator energized throughout the remainder of the code pulses of the character being transmitted. At the end of the character, flop CCA is reset by a high signal on lead TOO (Turn Off Oscillator), and oscillator 46 is deenergized.

(Note: Flop CCA, like several other flops shown in the disclosure, has the ability to mix clock signals internally. Specifically, this flop includes set and reset inputs RECA and Ground respectively which work in conjunction with the clock signal OSC produced by oscillator 46, and also includes set and reset inputs PLS and TOO which work in conjunction with another clock signal CLKA developed in the message assembler 40 as will be described. Such dual-function flops are conventional and available commercially. It should also be noted that the system is so arranged that there will be no conflict between the two pairs of input circuits, i.e. each flop will at any one time be subject to the control of only one input.)

Whenever a clock pulse is produced by the oscillator 46, the corresponding code pulse is stored in flop LAAA. For example, when the first clock pulse is generated, LAAA remains in set condition (i.e. the reset output lead LAAA is low and the set output LAAA′ is high) because the corresponding reset input lead RCA is low during the teletypewriter start pulse. At the same instant, flop BPRA (Bit Present in A unit), will be set and its output lead BPRA made high because set input RECA is high when the OSC clock pulse arrives. Setting of this flop BPRA is effective, as will be explained, to indicate to the main controls in the message assembler 40 that a bit has been stored in flop LAAA and is ready for transfer to the temporary storage register.

As will be evident from the subsequent description of the message assembler 40, the sampled data bit stored in flop LAAA is transferred to the temporary storage register sometime during the 10 milliseconds immediately following the OSC clock pulse, the exact time of transfer depending upon the availability of access to the particular storage register assigned to the teletypewriter involved. Immeditaley after transfer of this data bit, circuitry in the message assembler causes lead RBP (Reset Bit Present) to go high to indicate that the transfer has been effected, and simultaneously the next clock pulse CLKA appears to reset flop BPRA and set flop LAAA. Thus, the line terminal unit 14A is conditioned to receive and store the next data bit arriving over line 12A.

The CLKA and OSC pulses are not synchronized, and, simply by way of example, FIGURE 3 shows a first CLKA pulse appearing about 5 milliseconds after the first OSC pulse; thereafter CLKA pulses occur at 10 millisecond intervals. The CLKA pulse is fed to flop LAAA together with RBP (high, after transfer of a data bit) in order to set flop LAAA prior to receipt of the next line pulse. It may also be noted that if two CLKA pulses occur before the next code pulse is sampled at the next OSC clock signal, there will be no transfer of data to the message assembler 40 at the second CLKA pulse; this inhibiting effect is provided by flop BPRA which remains in reset condition until the next sampled data bit is placed in flop LAAA at the next OSC pulse.

Figure 4:
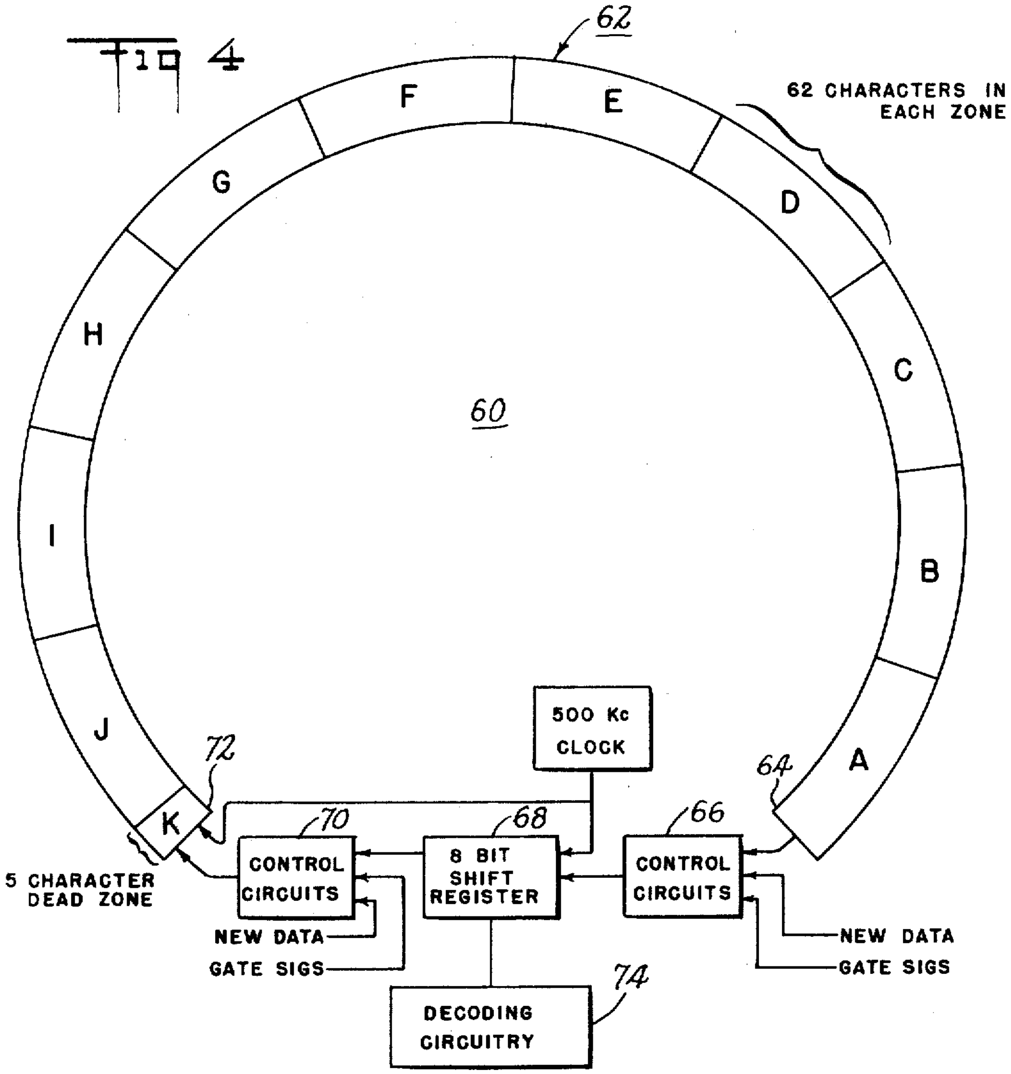
FIGURE 4 shows diagrammatically the delay line data storage arrangement.

The incoming data bits transferred from flop LAAA to the message assembler 40 are stored in a recirculating memory means 60 which is illustrated diagrammatically in FIGURE 4. This memory means includes a magnetostrictive delay line 62 having, in the present embodiment, a storage capacity of 5000 bits. This delay line is operated at a clock frequency of 500 kilocycles so that the time of transit through the line is 10 milliseconds. Such delay lines are well known in the art, and may for example be obtained, with all necessary input and output controls, from commercial sources.

The output end 64 of the delay line 62 is connected through gating control circuitry 66 to an eight-bit shift register 68. Thus, the total storage capacity, including this shift register, is 5008 bits. The output of the shift register is connected through further gating control circuitry 70 to the input end 72 of the delay line.

The 5000 bit capacity of the delay line 62 is divided into 11 zones. The ten principal zones A through J contain 496 bits each. The eleventh zone K is merely a "dead" zone of 40 bits of storage capacity which is not used in the present embodiment, and thus will be disregarded in the following description.

Each of the first eight principal zones A through H is assigned to a corresponding one of the teletypewriters 10A, 10B, etc., and will contain all the message data transmitted from the corresponding teletypewriter and sampled by the respective line terminating unit 14A, 14B, etc., previously referred to. The remaining two principal zones I and J are used to store any reply data developed by the data processor 42 pending the retransmittal of such reply data to the initiating teletypewriter.

The data stored in the delay line 62 is in the form of eight-bit characters. Thus each zone A–J has a capacity of 62 characters, and the external shift-register 68 has a capacity of one character.

Figure 5:
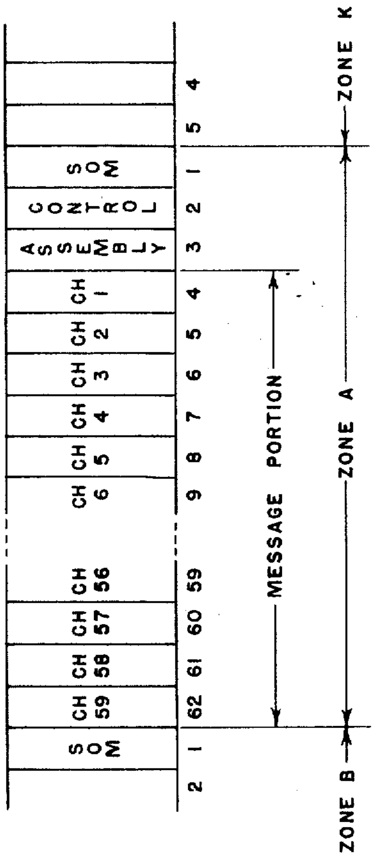
FIGURE 5 is a diagram illustrating the character layout of one zone of the delay line.

FIGURE 5 shows the character mapping of zone A, the other zones B–J being the same. The first character section contains a unique start-of-message (SOM) character consisting of eight "logical ones" which are maintained permanently in the delay line. No other character section in the zone will contain this code. This character SOM serves as an address control tab to identify the start of each zone, and checks the operation of the system counters to be described.

The second character section serves as a locator control to identify the position in which the next data bit is to be stored, or from which the next data bit is to be read. That is, this control section specifies whether the next bit to be operated on is the first data bit of a character, the second data bit, etc. To thus identify the proper position of the next data bit, this control section contains only one "logical one." In other words, seven of the eight positions of the control character will be logical zeros, while the remaining position will be a logical one serving as a "marker bit." This marker is shifted through the various positions of the control character by means of circuitry responsive to the receipt and storage, or readout, of each data bit.

The third section of the zone is the character assembly area. The various data bits of each character are initially transferred to this section from flop LAAA one at a time, as the code pulses are sampled at the corresponding line terminal unit 14A. When a complete character has been assembled, it is analyzed by a decoder generally illustrated at 74 (FIGURE 4) to determine whether it is one of several special control characters. If not, e.g. if it is a normal message character, it is transferred to the next available section in the message region, sections 4 through 62, also identified in FIGURE 5 as characters CH1 through CH59. If the assembled character is one of the special control characters, as will be described, the specific control action required is effected by circuitry responsive to the output of the decoder 74.

Figure 6:
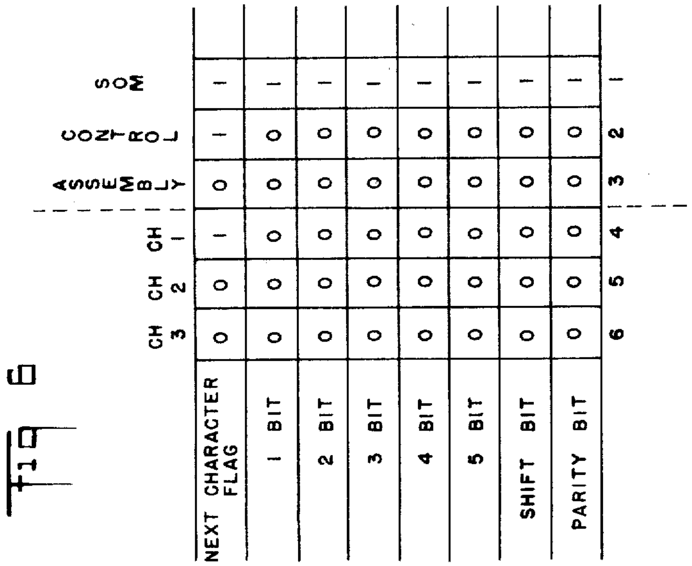
FIGURE 6 is a diagram illustrating the arrangement of bits stored in a zone of the delay line before the first teletypewriter signal is received.

FIGURE 6 illustrates the status of the first six sections of zone A when the corresponding terminating unit 14A is in "receive" mode, and at a time before any code pulses have been transferred from flop LAAA in the terminal unit. (Note: Although the delay line 62 is a serial storage device, for illustrative purposes the character sections of the storage zones are shown herein in parallel configuration simply to permit a more ready comparison of the characters.) The first character section SOM is composed entirely of logical ones, as mentioned previously, and thus identifies the start of this zone. In the control section, the marker bit is in the top position, indicating that the code bit being received is the "start" pulse of the teletypewriter code.

When the first data bit is received following the start bit, the marker bit is automatically shifted down one position in the control character so that the received data bit will be placed in the second position down in the assembly section. Similarly, the marker bit moves down to the third position upon receipt of the second data bit, and so on through the remaining data bits. After five data bits have been recorded in positions two through six of the assembly section, another bit is stored in the seventh position down to indicate whether the teletypewriter character was transmitted while the teletypewriter was in "Figures" or "Letters" status, that is, whether the teletypewriter shift key had been actuated at some previous time during transmittal of the particular message. This function is performed by circuitry in the message assembler which detects the Figures or Letters character whenever it is transmitted, and writes a logical one or zero in the seventh position. A similar bit is written in the seventh position of each following character until a later Figures or Letters, and the bit written thereafter in the seventh position of each character is changed from one to zero or vice versa. The eighth position is supplied with a "parity" bit by means of the usual parity generator, for subsequent error checking.

If the assembled character is not a special control character, it is transferred to the next available (i.e. unoccupied) message storage section. The location of this next storage section is identified by a logical one which is placed in the first, or top, position of the section to which the next character is to be transferred. This logical one, referred to in FIGURE 6 as the "next character flag," identifies the fourth section (CH1) at the start of receiving operations, since this fourth section is the first available section in which message characters can be stored. When the first character has been placed in this section, the flag bit is moved to the top position in section 5 (CH2) to cause the next character to be transferred from assembly to this latter section.

Figure 7:
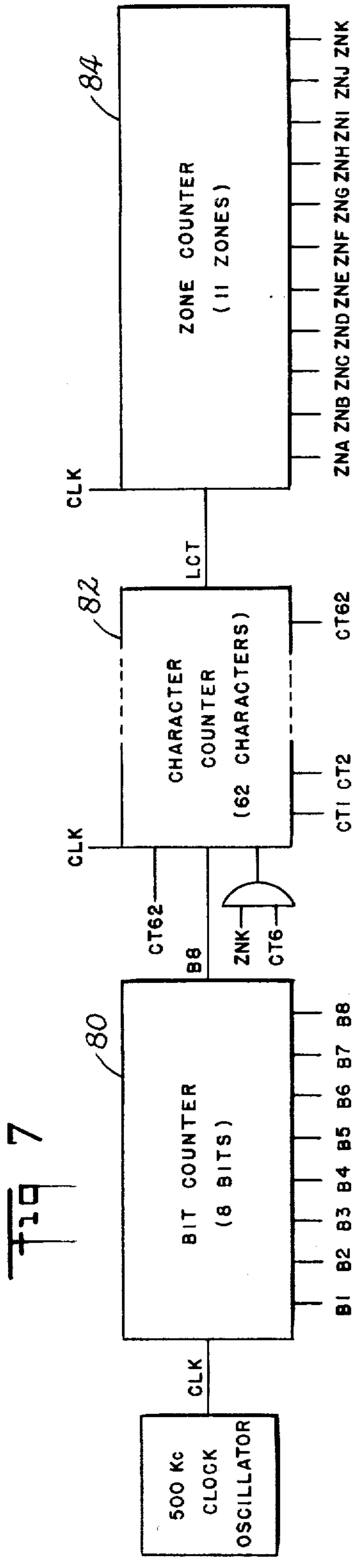
FIGURE 7 shows diagrammatically the system counters used to keep track of the circulating data in the delay line.

In order properly to synchronize the various gating operations with the circulation of data around the delay line 62, appropriate counters are provided as indicated in FIGURE 7. These include a bit counter 80 operated directly by the 500 kc. master clock to energize, in sequence, eight lines identified as B1, B2 . . . B8, returning each time to B1 to continuously recycle the counter. The operation of this bit counter also is used to activate, once every eight bits, a character counter 82 which, while the delay line output is in the ten normal zones A–J, sequentially energizes 62 lines identified as CT1, CT2 . . . CT62. When in the dead zone K, this counter 82 is reset after the 6th count, so as to start the character count for the next zone A in proper synchronism. Counter 82 also serves to activate a zone counter 84 which energizes sequentially eleven lines ZNA–ZNK, each corresponding to one of the eleven zones in the delay line 62. Access to the delay line and to the shift register 68, through gating circuitry 66 and 70, is controlled by these counters 80, 82 and 84 to assure that the data bits are placed in or taken from the proper positions of the memory means 60.

It will be evident that various forms of circuitry can be devised for controlling the transfer of the data bits to and from the delay line 62, making use of logical control devices which are well known in the art. However, the preferred control circuit arrangement will be outlined briefly hereinbelow.

The principal control decisions and operations are carried out during the first three "character times" CT1, CT2 and CT3 of each zone A–H, i.e. during the time that the first three characters (SOM, Control, and Assembly) are being stepped into the 8-bit shift register 68. When the character counter 82 first energizes the line CT1, the first bit of the SOM character is clocked into the first stage BDA (referring to FIGURE 8) of the eight-bit shift register 68. Simultaneously, the counter output LCT (Last Character Time) goes high to reset most of the various control flops shown in the detailed logic circuit diagrams of FIGURE 9 et seq. Thus, the control circuitry is cleared for fresh operations in the new zone (A) which has just been entered.

Figures 9, 10, 11, 12, 13, 14, 15, 16, 17:
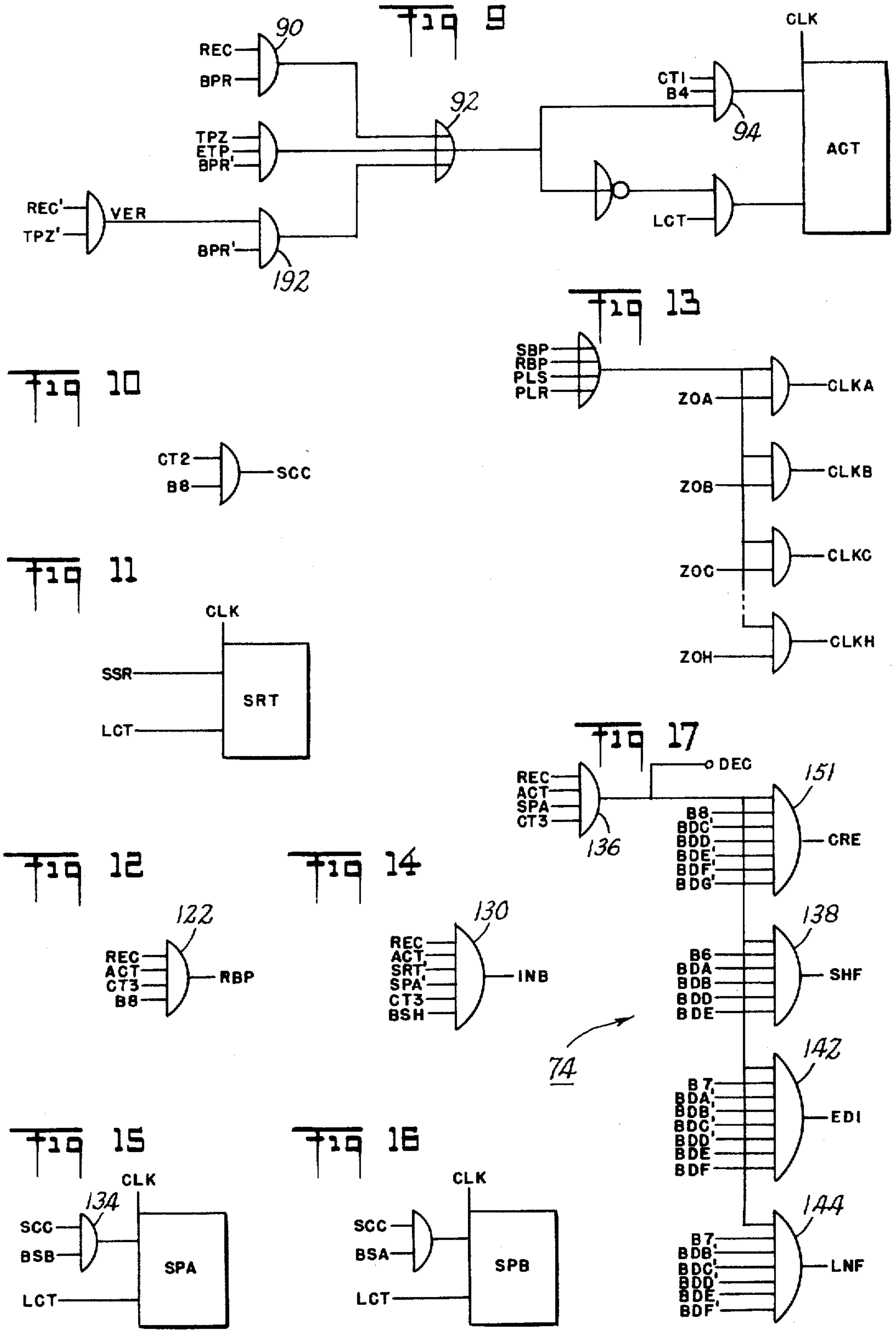

FIGURE 9 shows logic circuitry which initiates control operations as a storage zone, A in the present example, is entered. Specifically, if terminating unit 14A is in "receive" mode (RECA high) and if a code bit is stored in flop LAAA (BPRA high) an AND gate 90 will transmit a logical one through an OR gate 92 to another AND gate 94. (It should be noted that REC and BPR, the inputs to gate 90, are obtained from a zone multiplexing arrangement shown in FIGURES 34–38; the result is that REC and BPR go high if RECA and BPRA are high when the counter 84 is at ZNA, i.e. when in zone A, and if the processor 42 is not transmitting.) The other inputs to gate 94 are the character and bit counter outputs CT1 and B4. Thus, when the fourth bit of the SOM character has entered the shift register 68, gate 94 will open, and thereby cause a flop ACT to set at the next pulse of the master clock, i.e. at the next bit time. Setting of this flop ACT indicates that "action" of some kind will be required during the impending sweep through zone A.

Whatever "action" is to be performed, the marker bit of the control character must be shifted to its next position in order properly to identify the data bit involved in the action. Normally, this involves shifting the control bit down one position, e.g. from top position to the second position. However, if a complete character has just previously been received, the marker bit of the control character will be in the 7th position, and thus the presence of a bit in flop LAAA indicates that the "start" pulse of a new character has been received. Therefore, the marker bit must be shifted up to the top position.

To accomplish the more usual action of dropping the marker bit down one position in the control character, the set output of flop ACT, FIGURE 9, is directed to the input of an AND gate 96, FIGURE 8*a*. (Note: Whenever a lead is marked with letters designating a "flop" or other signal source, it means that lead is connected to the normal or "set" output of the signal source or flop. If the lead designation is "primed," e.g. ACT′, this means the lead is connected to the inverse output of the signal source, i.e. the "reset" output of the flop.) Gate 96 also receives the set output of flop BDA (the first stage of shift register 68) and is turned on by timing signals CT1, CT2 and CT3 through gates **97*a* and 97*b*. Thus, the entire control character, including the "logical one" marker bit, is passed through gate 96 into a eight-bit buffer register 98. However, since this buffer register is fed from the output of BDA, the data stored in register 98 is delayed one bit with respect to the data in register 68. For example, if the marker bit was originally in the top position (as shown in FIGURE 6), then at the time (B8) that the entire control character is in register 68, the marker bit will be in stage BDH of register 68, but the corresponding delayed marker bit will be in stage BSG of register 98**.

At the start of CT3, when the control character normally would begin to enter the delay line 62 from shift register 68, the connection between this register and the delay line is interrupted and the output of buffer register 98 is connected to the delay line instead. Specifically, and with reference to FIGURE 8*b*, the gating control circuitry 70 includes an AND gate 100 which is activated whenever CT3 is high, ACT is set, and B8′ is high. (Note: B8′ high merely means that B8 is low, which is true only at times B1–B7.) Thus, as the start of CT3, the output of gate 100 goes high to activate another AND gate 102. This gate also receives the output BSH of buffer register 98, as well as a control lead 104 which is high except at B7 time in receive mode. Therefore, during CT3 time, the next six bits stored in buffer register 98 are passed through gate 102 and an OR gate 106 to the input of delay line 62.

Consequently, if the marker bit had appeared in stage BSG of register 98 just prior to CT3 time, as assumed above, this control bit would, in effect, have been moved to the second position down (referring to FIGURE 6) in the control character. This would indicate that the incoming data bit is to be placed in the second position down in the assembly section. Register 98 is cut off from delay line 62 at time B7 to prevent placing a marker bit in the eighth position of the control character when in "receive" mode. Similarly, the register output connection also is cut off at time B8 to prevent any data bit from being inserted in the top position of the assembly section which follows the control character into the delay line.

As mentioned above, the connection between the shift register 68 and delay line 62 is interrupted during the transfer of data from buffer register 98 while CT3 is high. For this purpose, the high output of gate 100 passes through an OR gate 110 to an inverter 112. The resulting low output of this inverter turns off the main AND gate 114 which is supplied with signals through an OR gate 113 and an AND gate 115 so as to connect the output (BDH) of shift register 68 with the input of the delay line 62. Thus, the delay line receives only the data from buffer register 98 during this time.

If the marker bit had been in the seventh position, it would be necessary to shift it up to the top position, rather than merely drop it down one spot as outlined above. For this purpose, the gating control circuitry 70 includes an AND gate 116 which detects the presence of the marker bit in stage BDB of register 68, i.e. the stage which corresponds to the seventh position of the control character at B8 and CT2 time. Gate 116 is turned on at this time by a preceding gate 118 which is controlled by ACT and a lead SCC, the latter representing the AND combination of CT2 and B8 (FIGURE 10). Thus, if the marker bit is in BDB, it is immediately advanced through gate 116, an OR gate 120, and gate 106 to the delay line 62. Accordingly, the marker bit would be placed in the top position in the control character.

When the output of gate 120 goes high, and the marker bit is moved up to the top position in the control character, this indicates that the code bit to be operated on is a "start" pulse. The output of gate 120, labelled SSR, is directed to a flop SRT (FIGURE 11) which sets on the next clock pulse to signify that the start pulse is involved. No data bit is placed in the assembly section of the zone under these conditions since the start pulse merely pertains to operation of the teletypewriters and does not represent transmitted data.

Although no data bit is inserted in the delay line 62 corresponding to the start bit, it nevertheless is necessary to reset the BPRA flop in the terminating unit 14A (FIGURE 2) to indicate that the start bit has been recognized and dealt with. This result is accomplished by a gate 122 (FIGURE 12) which goes high at CT3 and B8 time, providing ACT is set in "receive" mode. The output RBP (Reset Bit Present) of this gate goes directly to flop BPRA (FIGURE 2). The clock pulse CLKA for this flop is derived from a gating circuit shown in FIGURE 13, and which assures that only the BPR flop in the proper terminating unit will be reset when the RPB goes high.

Returning now to the control character in the delay line, if the marker bit is initially in the top position at the time a data bit is received, the marker bit would be moved down to the second position as previously described, indicating that the pulse received from the teletypewriter is the first one of the five data bits. This data bit therefore would be placed in the second position down in the assembly section of zone A. The insertion of the data bit is timed by an AND gate 130 (FIGURE 14) which is activated during CT3 to produce a high output INB (Insert Bit) whenever the marker bit appears in stage BSH of buffer register 98. At this instant, the data bit is inserted in the first stage BDA of shift register 68 (FIGURE 8), thus taking a position exactly 8 bits behind the present location of the marker bit.

For this purpose, the shift register input control circuitry 66 is provided with an AND gate 132 to which is directed LAA and INB. LAA corresponds to LAAA (see the multiplexing circuitry of FIGURE 36) when the delay line is sweeping through zone A, and thus indicates whether a logical one or zero is to be transferred. Accordingly, gate 132 passes the waiting bit at the correct instant, and this bit is directed through a main OR gate 133 to the input of the first shift register stage BDA. Thus, the sampled data bit from the teletypewriter is stored in the assembly section of zone A and at the appropriate position determined by the location of the marker bit in the preceding control character section.

If the sampled code pulse represents a "stop" bit of the teletypewriter signal, no corresponding data bit is inserted in the delay line. The sampled pulse will correspond to a stop bit when the marker bit moves to the seventh position down (and the eighth position as well, if in "send" mode). When this occurs, it indicates that the data bits stored in the assembly section represent one complete character transmitted from the teletypewriter. This condition is detected by a flop SPA (FIGURE 15) the set input of which is activated from an AND gate 134 which combines SCC (CT2 plus B8) and BSB. Another flop SPB (FIGURE 16) sets when the second stop bit is being operated on in "send" mode.

Accordingly, if the marker bit is in the seventh position (BSB) at CT2 and B8 time, flop SPA will set. The set output lead SPA will go high, and the reset lead SPA′ will go low. SPA′ is one of the inputs to AND gate 130 (FIGURE 14), and this gate therefore cannot activate INB to insert the LAA bit in the shift register 68. In addition, SPA high opens an AND gate 135 (FIGURE 33) which passes a high signal to an OR gate 254 to activate TOO to turn off oscillator 46 (FIGURE 2) and stop the receiving functions until the next start bit. However, other control functions are performed, as described hereinbelow.

Referring now to FIGURE 17, when SPA goes high, ACT is set, and the unit is in receive mode, an AND gate 136 is turned on during CT3 time, i.e. during the bit times B1 through B8 as the assembled character is stepped into the shift register 68. When the output DEC of this gate goes high, it indicates that decoding of an assembled character is to be performed.

The first decoding occurs at B6, and is performed by an AND gate 138 to determine if the assembled character is either a letters or figures character transmitted by the teletypewriter, i.e. a case-determining code. If the assembled character is either of these, then SHF will go high for the purpose of inserting in the seventh position of the assembly section a data bit identical to the bit already stored in the fourth position. When the assembled character is letters or figures, the fourth position of the character (actually the third data bit) determines which of these two possible characters is present, and thus the seventh position (indicating whether "shift" or not) is supplied with a corresponding logical one or logical zero. This action is performed by an AND gate 140 (FIGURE 8) which combines SHF and BDC, and feeds a corresponding bit through OR gate 133 to register 68. All subsequently received characters will be supplied with the same bit in their seventh position, until another "shift" character is received from the teletypewriter to change from letters to figures or vice versa. Thereafter, all characters received will be supplied in their seventh position with a bit corresponding to the new shift character.

If the assembled character was neither letters nor figures, then at CT3, B7 time, two AND gates 142 and 144 (FIGURE 17) are turned on to determine whether the assembled character is a "hyphen" or "line feed" respectively. If a hyphen character, EDI (standing for "edit") goes high, and if a line feed character, LNF goes high.

The edit function is provided to enable the operator of the teletypewriter to advance the carriage of his machine and skip over characters stored in the delay line 62 without causing any change in the recorded data. Thus, the only action that need be taken is to advance the "character flag" to the next message section each time a "hyphen" character is detected in the assembly section.

Figure 18:
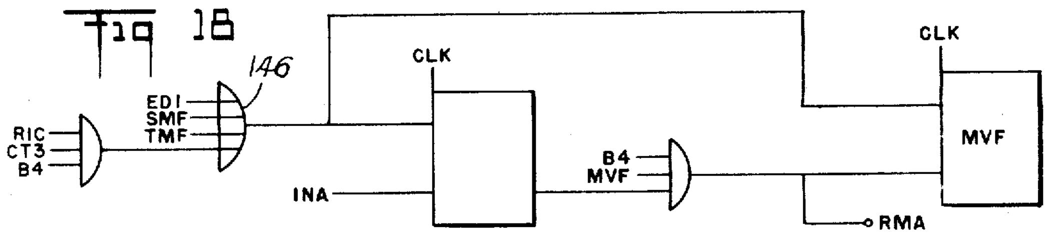

Referring to FIGURE 18, this flag advancing action is initiated by a flop MVF (Move Flag) the set input of which is derived from an OR gate 146 having EDI as one of its inputs. When this flop sets, at the next clock pulse, its high output is fed to one input of an AND gate 148 (FIGURE 8), the other two inputs of which are B8 and BDH. Thus, the next time BDH goes high at time B8 (indicating that the flag has been detected), the output of gate 148 goes high. An inverter 150 produces a low signal which is directed to AND gate 114 so as to assure that the next bit fed to the delay line is a logical zero. This scrubs out the present flag bit. At the same time, the high output INA of gate 148 is directed to the main OR gate 133 to insert a logical one into the input of the shift register 68, thereby placing a new character flag in the top position of the next succeeding message character.

If the gate 144 had detected a "line feed" character, LNF would go high. However, the only action taken in the message assembler 40 is to prevent the transfer of this assembled character to any of the message sections in the delay line. The line feed character is ignored because the feeding of paper at the teletypewriter has no effect on the data being transmitted or stored.

If none of the preceding characters was detected, then, at time B8 of CT3, an AND gate 150 (FIGURE 17) is activated to determine whether the character stored in the assembly section is "carriage return." If so, CRE goes high, and controls are energized to return the character flag to the first message section, in order that the next character received will be placed in the first message storage section, i.e. corresponding to the left-hand margin of the paper at the teletypewriter.

CRE is directed to one input of the main OR gate 133 (FIGURE 8), and thus inserts a logical one in BDA at the next clock, that is, in the top position of the first message character section. CRE also is fed through an OR gate 152 (FIGURE 19) to turn on a flop CAF (Clear All Flags). The high output of this flop is fed to an AND gate 154 in the gating control circuitry 66 (FIGURE 8) which adds the B8 time signal to produce a high output every time the top position of a character is to enter the shift register 68. This high output is passed through an OR gate 156 to an inverter 158 the low output of which cuts off data entry AND gate 160, thereby preventing the delay line output DLN from entering the shift register. Consequently, the previously stored character flag is erased, regardless of its position, and a new flag is inserted in the first message section (actually the fourth section of the zone).

Figure 20:
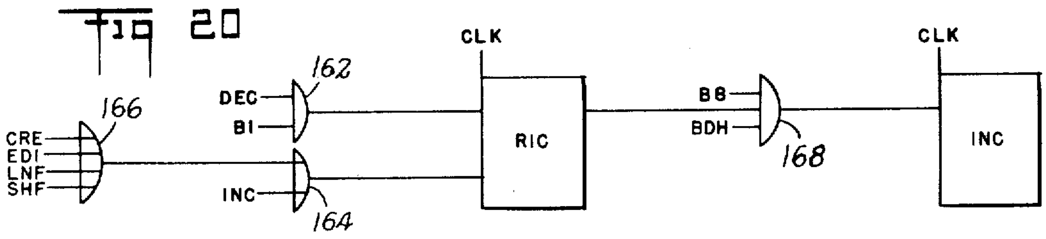

If the assembled character is not a special control as identified above, this character is transferred to the next available message section. Referring to FIGURE 20, the DEC lead is fed to an AND gate 162 together with B1. Thus, at the start of CT3 when DEC goes high, the output of gate 162 will go high to set flop RIC (Remember to Insert Character). This flop would be reset immediately if any of the previously described control characters is thereafter detected, since the outputs of the decoding circuits are connected to the flop reset terminal by OR gates 164 and 166. However, it will be assumed that flop RIC is permitted to remain in its set state to enable the insertion of the assembled character at the next available section.

In the meantime, the assembled character has been read out from the shift register 68 (FIGURE 8) and into the buffer register 98. This transfer takes place through gate 96 which is held open during CT3, when in "receive" mode, by a signal passed through an OR gate **97*a* from an AND gate 97*b*. At the end of CT3, the output of gate 97*a* goes low, thereby closing gate 96 to cut off any further transfer of data into buffer register 98. At the same time, however, the low output of gate 97*a* is converted to a high signal by an inverter 176, and serves to open another AND gate 178 which connects BSH into the register input stage BSA. Thus, a feedback connection is established, and the assembled character stored in register 98** recirculates around this register while other control circuitry searches for the next available message section.

Returning now to flop RIC, FIGURE 20, the set output of this flop turns on an AND gate 168 having as its two other inputs BDH and B8 which serve to detect the presence of the character flag identifying the next available message section. When the output of gate 168 goes high, it turns on a flop INC (Insert Character) which causes the character presently in the assembly section to be recorded also in the message section identified by the character flag.

In more detail, when this flop INC sets, its reset output INC′ goes low to turn off AND gate 114 (FIGURE 8) and interrupt the flow of data bits into the delay line 62. The set output INC, however, turns on another gate 170 to connect BSG to the delay line, and thereby feed into the delay line storage the assembled character which has been recirculating around the buffer register 98. B7′ and B8′ (which go low during B7 and B8 times) are also connected to gate 170 in order to prevent filling the eighth position of the section being loaded and the first position of the following section. A gate 171 feeds gate 106 to insert the parity bit at the appropriate time. Flop INC is reset at B8 time, and thus gate 170 is prevented from transferring further data to the delay line. Flop MVF (FIGURE 18) is subsequently set through an AND gate 145 feeding OR gate 146, thereby advancing the character flag to the next section in the storage.

If the assembled character is an ordinary message character, the storing of the data bits in a message section completes the control functions pending the receipt of further signals from the teletypewriter. However, the stored character may be one of certain special operational characters, and in that event further steps, as outlined hereinbelow, are carried out.

Figures 19, 21, 22, 23:
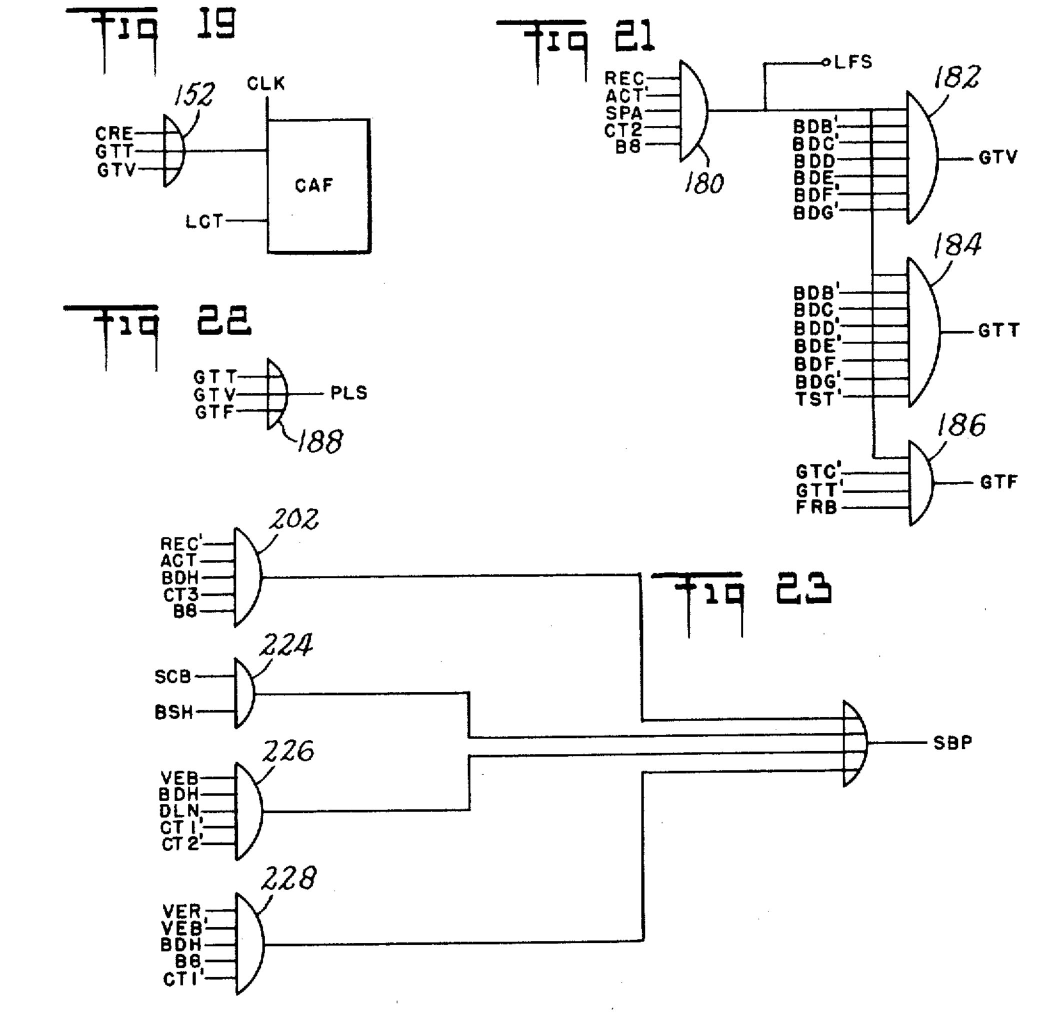

Referring now to FIGURE 21, there is provided an AND gate 180 which produces a high output after an assembled character has been transferred to the message region of the delay line. Specifically, this gate goes high when the equipment is in "receive" mode, the ACT flop is reset (indicating that there is no bit awaiting transfer), SPA is high (indicating that a complete character is present in the assembly section), and when CT2 and B8 both go high, i.e. when the complete character is stored in the shift register 68. When this gate opens, its output LFS (Look For Send) goes high, to open three subsidiary AND gates 182, 184 and 186 which determine whether the assembled character is one of the special operational signals referred to above.

The upper gate 182 determines whether the assembled character is the "verify" signal, in this case a "comma" character. If so, the gate output GTV (Go To Verify) goes high. This signal initiates a sequence of operations by means of which all of the stored message characters are transmitted back to the teletypewriter 10A and printed out for comparison with the message initially printed out during composition of the message.

If the assembled character is the verify code "comma," the resulting high output GTV passes through an OR gate 188 (FIGURE 22) to produce a high signal on PLS (Put Line in Send). Reverting to FIGURE 2, PLS is directed to the reset input of flop RECA and operates with CLKA (which goes high with PLS as seen in FIGURE 13) to reset this flop. PLS is furnished to a "forced" set input of flop LABA to assure that LABA' is high, i.e. that the unit 14A is marking the line 12A. Additionally, PLS sets flop CCA to turn on the oscillator 46 which produces a pulse after a delay of about 6.7 milliseconds and at 13.5 millisecond intervals thereafter. These various actions condition the line terminating unit 14A for transmission of data from the message assembler 40 to the teletypewriter 10A.

It should be noted that the system works in "send" mode in much the same way as in "receive" mode previously described. That is, the stored characters are read out to the transmission line 12A, in the form of standard teletypewriter code pulse signals. The particular bit to be transmitted is determined by the position of the marker bit in the "control character," and the particular character being transmitted at any given time is identified by the single character flag in the top position of the assembled message character.

As each bit is transmitted, the marker bit is shifted down one spot to identify the next bit to go out. Similarly, as each character is completed, the flag bit is advanced to the top position of the next message section so that the next character to be transmitted is identified for the control circuitry.

The transmission of the bits is at the standard teletypewriter code pulse rate, as determined by oscillator 46. The character transmission rate is at the maximum operating speed of the teletypewriter, e.g. 100 words per minute. The data bits are transferred from the message assembler 40 to the flop LAAA, from which they are shifted to flop LABA at the next OSC pulse to be placed on the line through OR gate 28.

When the operator calls for a "verify" transmission by typing a "comma," the message assembler 40 first must create and transmit to the teletypewriter a carriage return character followed by a line-feed character. This is for the purposse of automatically conditioning the teletypewriter to start the verify print-out on a fresh line of the paper, thereby to assure that there will be sufficient space to print out the entire stored message, and to prevent any typing over of previous material. In addition, by starting the retransmittal on a fresh line, the stored message will normally appear directly beneath the original message, thus facilitating visual comparison by the operator.

The character flag first must be removed from the message region in order to prevent the transmission of a legitimate message character until after the synthesized carriage return and line feed characters have been sent to the teletypewriter. For this purpose, GTV is fed to gate 152 (FIGURE 19) to set flop CAF (Clear All Flags) which removes the character flag as previously described. GTV also is directed through an OR gate 190 (FIGURE 8) and thence through gate 106 to place the flag bit in the top position of the assembly section as this section begins to enter the delay line 62.

Initially, the marker bit of the control character will be in the seventh position down, indicating that the last operation was the receipt of a stop pulse from the teletypewriter. With the line terminating unit 14A placed in send mode, REC will go low, and the marker bit will shift down to the 8th position. Thereafter, with the ACT flop (FIGURE 9) set by the high output of an AND gate 192, the marker bit is moved up to the top position through gates 120 and 122 as described above with reference to the "receive" mode. Simultaneously, flop SRT (FIGURE 11) sets to indicate that the start pulse is being operated on, i.e. the start pulse is the first bit to be transmitted.

At this time, flop LAAA (FIGURE 2) is loaded with a start bit (spacing) to be transferred to flop LABA and thereby sent out over the line 12A. Flop LAAA is loaded when SBP (FIGURE 23) goes high, it being noted that SBP (Set Bit Present) generates the clock pulse CLKA (FIGURE 13) which is fed to flop LAAA (FIGURE 2). When CLKA is applied to this flop, a data bit is loaded therein corresponding to the signal on lead POS (FIGURE 24), i.e. if POS is high, then a spacing (or "start") pulse is to be sent out, and if POS is low, then a marking pulse is to be sent out.

Figure 24:
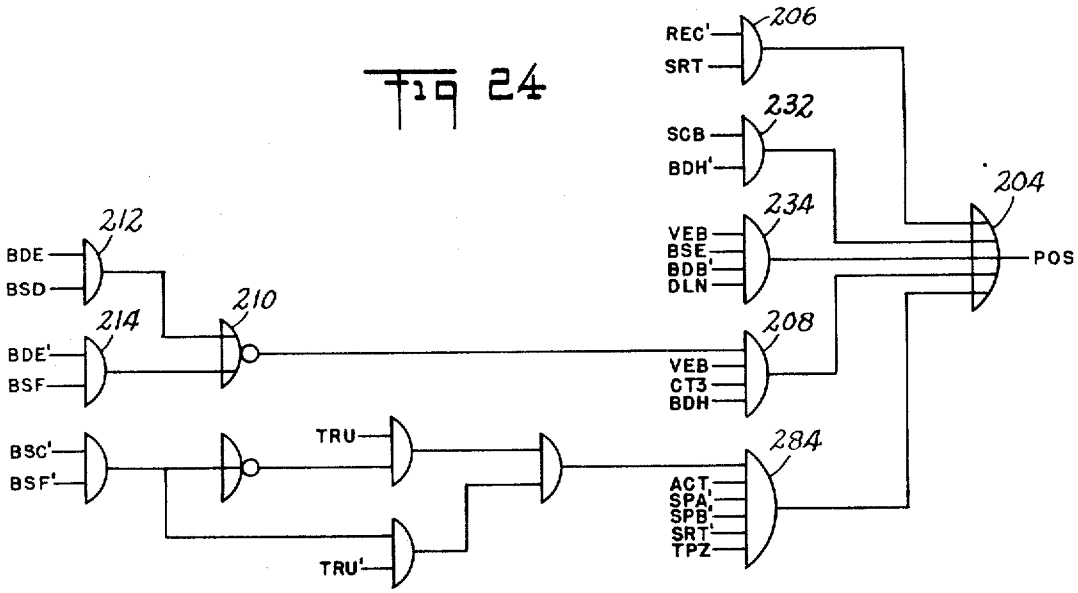
Figure 25:
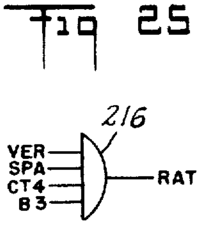
Figure 26:
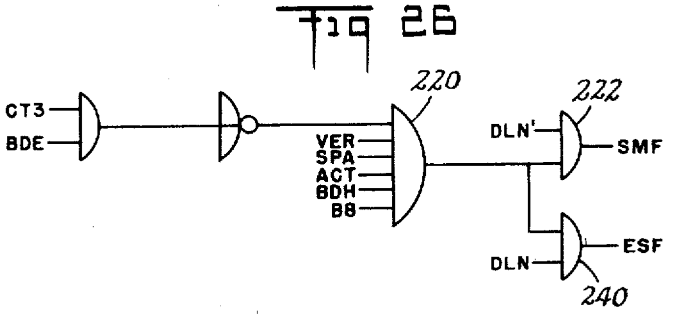
Figure 27:
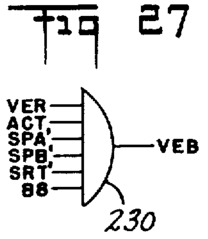
Figure 28:
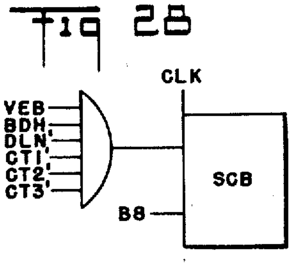
Figure 30:
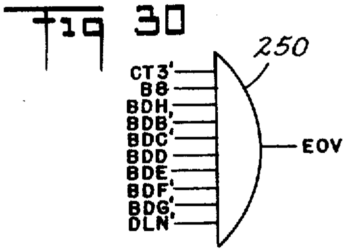

Reverting to FIGURE 23, SBP is controlled during development of the carriage return and line feed characters by an AND gate 202. The latter goes high at B8 and CT3 time, providing the character flag is in the assembly section, i.e. BDH is high. Referring now to FIGURE 24, POS is high at this time by virtue of a signal from an OR gate 204 and an AND gate 206 which is energized from flop SRT (FIGURE 11) when not in "receive" mode. Thus, the high signal on POS loads a "spacing" signal into flop LAAA, FIGURE 2. This bit is transferred to flop LABA at the next OSC pulse, and is immediately transmitted therefrom out over the line 12A, as the "start" pulse for the carriage return character being sent to the teletypewriter 10A.

On each sweep through the delay line, the control character will enter the buffer register 98 (FIGURE 8) through gate 96 and, if BPR' is high (gate 192 in FIGURE 9), the marker bit will be delayed one more position in this register. Thus the bit circulates through the control character and indicates, by its position in that character at any given instant, the particular code pulse to be transmitted. This continual shifting of the marker bit is used in conjunction with the data already in the assembly section (a "comma" plus a flag bit in the top position) to generate the code for carriage return, i.e. a character having only the fourth data bit marked. This code generation is accomplished by the circuitry which energizes AND gate 208 (FIGURE 24), including an OR-Inverter 210 and AND gates 212 and 214, the latter being connected to certain stages of registers 68 and 98. Accordingly, with this arrangement, during transmittal of the first character POS will go high each time SBP goes high, except that POS will be low for the fourth data bit as a result of the high output from gate 212 at the time of sending this data bit. Thus, the first character transmitted will be the code for carriage return.

After all the data bits for the carriage return character have been transmitted, the first stop flop SPA (FIGURE 15) will set, and this in turn will energize an AND gate 216 (FIGURE 25) to cause its output RAT (Remove Assembly Three-bit) to go high at CT4 and B3 times. The inverse of RAT, i.e. RAT', will thus go low, and this lead is fed to the main gate 114 (FIGURE 8) to prevent the third bit in the assembly section from passing back into the delay line. In other words, this circuitry places a logical zero in the 3rd bit, rather than a logical one as in the comma originally entered in this section.

With this change in the assembly section, the SBP and POS control circuitry (FIGURES 23 and 24) go through another complete cycle, but this time the code character for "line feed" is synthesized rather than the code character for carriage return. The difference in the character transmitted results from the connections to gates 212 and 214 previously described.

The next step in the operation is to move the character flag from the assembly section to the first message section, so that the equipment will commence reading the stored data back to the teletypewriter. For this purpose, referring now to FIGURE 26, there is provided a gate 220 which goes high when a complete character has been transmitted (SPA high), the flag bit is present (BDH high) at time B8, ACT and VER are high, and provided there is no logical one in the third data bit (BDE) in the assembly section (CT3). The latter assures that the line feed function has been completed.

When gate 220 goes high, it will open another gate 222, provided there is no flag bit in the immediately following message section of the delay line, i.e. provided DLN' is high. When gate 222 opens, its output SMF (Set Move Flag) goes high to energize gate 146 (FIGURE 18) and thereby set flop MVF. As previously described, this will shift the flag bit to the next character, i.e. to the first message section, CH1.

Reverting now to FIGURE 23, during the subsequent transmission of the stored message characters, SBP will be controlled by one of three AND gates 224, 226 and 228. For each start or stop bit, gate 228 will be operative. For each of the five data bits, gate 224 will be operative. For the special shift characters (Figures and Letters) which must be generated whenever there is a case change, gate 226 will be operative.

Gate 228 will go high for a start bit whenever the character flag is detected, i.e. BDH high at B8 time, provided it is not CT1 time (since SOM has all ones, and thus a one in the top spot), and provided VEB' is high (meaning that VEB is low). This latter signal is generated by a gate 230 (FIGURE 27) which will be low if the bit being operated on is a start bit or one of the two stop bits. Thus, returning to FIGURE 23, for a start bit SBP will go high at B8 time, and POS (FIGURE 24) will be high at this time due to gate 206 which is energized by REC' and SRT, both high for the start of a character.

Once the start bit has been loaded into flop LAAA (FIGURE 2), SBP controlling CLKA for this flop will be generated by gate 224 (FIGURE 23). This gate, in turn, is controlled by the marker bit of the control character so as to send out the set of five stored data bits in proper sequence. In this regard, it should be noted that during each sweep of the delay line, the control character ends the buffer register 98 (FIGURE 8) through gate 96, and is continuously recirculated around this register because gate 178 completes the feedback connection at CT3 time.

Thus, one input BSH of gate 224 (FIGURE 23) will go high each time the marker bit of the control character reaches the last stage of register 98. The other input SCB of gate 224 is derived from a flop (FIGURE 28) which is set after CT3 time, whenever VEB (FIGURE 27) goes high at a time B8, whenever a character flag is detected (in BDH), and provided there is no flag in the following character. Thus, SCB sets to indicate that the character currently in register 68 is the one from which a data bit is to be read.

Accordingly, when BSH goes high after flop SCB sets, gate 224 opens to make SBP high and thereby read out the particular data bit involved. Referring now to FIGURE 24, the data bit is read out through an AND gate 232 which is energized by SCB (mentioned above) and BDH', i.e. the last stage of register 68. Stage BDH corresponds to stage BSH of register 98 containing the controlling marker bit at the instant SBP goes high. Thus, the data bit will always be read out from stage BDH of register 68, but the particular data bit involved will be determined by the instant in the cycle that the marker bit reaches BSH, and this latter time is determined by the position the marker bit occupies in the control character.

These data transfer operations continue until the message character data bits have been transmitted. At that point, two stop pulses are generated, corresponding to the seventh and eighth positions of the marker bit in the control character. This provides sufficient time for the character to be completely received and decoded by the teletypewriter mechanism. Each of these stop pulses is clocked by gate 228 (FIGURE 23) which energizes SBP as previously described. In addition, when the first stop pulse is developed, the character flag is moved ahead to identify the next character to be transmitted. Thereafter, the entire procedure is repeated.

As mentioned previously, in the present embodiment there is no provision for storing shift characters, and the case information is stored in a case-determining bit in the seventh position of each message character storage section. This is advantageous because it simplifies the editing procedure described hereinabove, eliminating any necessity for the operator to actuate his Letters or Figures key as he steps his carriage along to the position where an error is to be corrected by overwriting. In addition, this coding arrangement is more readily adapted for use with most data processors.

However, since the shift character is not stored as such, a Letters or Figures shift character may have to be generated at times during the verify transmission, since the original message may have included such a character. To this end, each time a character flag is set up in the top position of the new character next to be read out, a flop RIN is set at B4 (FIGURE 29), and a comparison is made of the bits in the seventh position of the new character and the previous character which has just been transmitted. If these bits are the same, the flop RIN is reset at the next following B6 time, and no action is taken since there was no case change.

Figure 29:
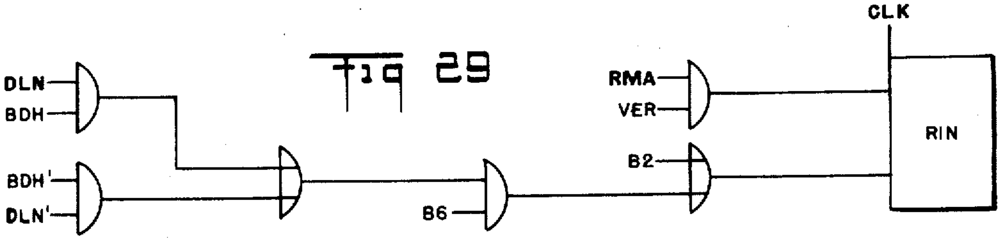
Figure 31:
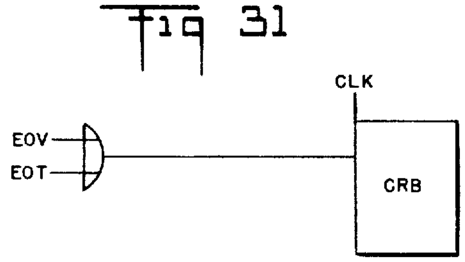
Figure 32:
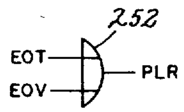
Figure 33:
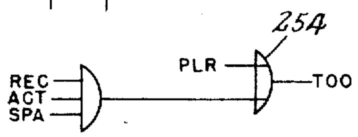
Figure 34:
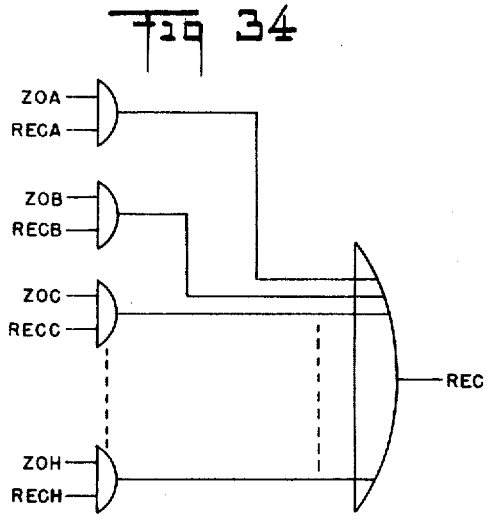
Figure 35:
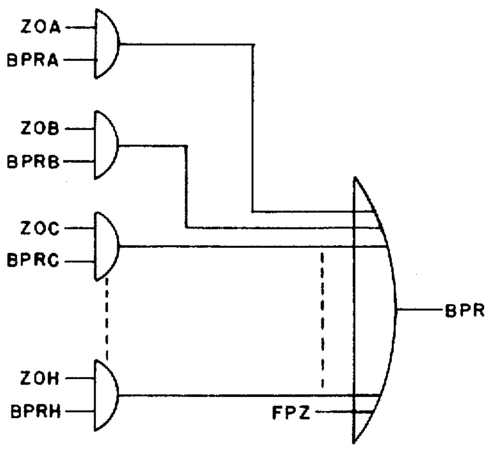
Figure 36:
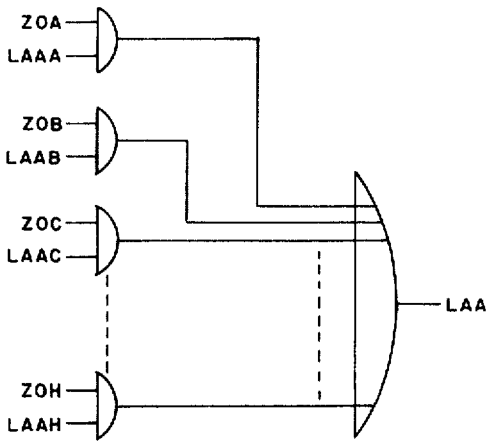

However, if the seventh position bits are different, as determined by the circuitry of FIGURE 29, the flop RIN will remain set and, at the following B8 time, another character flag will be inserted through a gate 230 (FIGURE 8) into the top position in the character following the new character which was about to be read out. Thus, there now are two character flags stored in the top positions of successive message sections. This condition is established for the purpose of disabling the normal read-out gating circuitry so as to prevent any further message read-out until the proper Letters or Figures character has been generated and sent back to the teletypewriter.

The start pulse of the shift character to be transmitted is developed in the usual way described above. Specifically, POS (FIGURE 24) goes high when energized by gate 206, and this signal is clocked out by SBP (FIGURE 23). Thereafter SBP is controlled by gate 226, at B8 times, to produce a clock signal whenever the two character flags are detected, i.e. when the next message character to be transmitted is in the shift register 68. During this operation, POS is controlled by AND gate 234 to produce the proper shift-character data bits.

It should be noted that the Letters character has all 5 data bits marked, while the Figures character has the 1st, 2nd, 4th and 5th data bits marked. Thus, for Letters character, POS must be low for each bit transmitted, while for Figures character, POS must be low except when the 3rd data bit is being transmitted. This result is accomplished by the input connections to gate 234. BSE connected as an input to this gate represents the 3rd data bit of the control character stored in the buffer register 98, and thus goes high when the third data bit is being transmitted. If at this time BDB' is high (indicating a logical zero in the seventh position of the next message character to be transmitted, i.e. the character marked by the first of the two flags), then POS will go high, to transmit a "space" on line 12A. Thus, the Figures character would be transmitted. However, if BDB' had been low at this third data bit, POS would remain low, and the Letters character would have been transmitted.

When all five data bits of the shift character have been transmitted, SPA (FIGURE 15) goes high, and the output of gate 220 (FIGURE 26) also goes high when the first character flag is detected. Gate 222 remains closed because DLN' is still low with the second flag present in the following character. However, a second AND gate 240 is driven by gate 220 and DLN, so its output ESF (Erase Second Flag) goes high to immediately blank out the second flag which is just entering the shift register 68. This blanking, or erasure, is accomplished by connecting ESA to gate 156 (FIGURE 8) and thereby close gate 160 through which the delay line signals DLN are normally fed to the shift register.

There is no erasure of the first character flag because flop MVF (FIGURE 18) is not set. Accordingly, the equipment now is conditioned to send back to the teletypewriter the character under the remaining flag bit, i.e. the next character in the sequence. This transmittal is accomplished in the regular manner described hereinabove.

Ultimately, the retransmittal operations during "verify" mode will reach the "comma" stored in the message region of the delay line. This condition is detected by a gate 250 (FIGURE 30) which produces a high output EOV (End Of Verify) when it finds the character flag with the comma in the shift register 68. (This gate is cut off during CT3 time to assure that it does not detect the comma originally placed in the assembly section.) EOV sets a flop CRB (Clear Remaining Bits) shown in FIGURE 31, and the set output of this flop is directed through gate 156 (FIGURE 8) to cut off data entry gate 160 while the remainder of the zone sweeps through the register 68 and back into the delay line. Thus, the subsequent message sections of that zone, the sections beyond the comma, are erased so that the teletypewriter operator can, if so desired, stop the message at that point. If the operator continues with message composition, the next character transmitted will overwrite the comma, thereby eliminating its effect on any other read out operations.

The high signal EOV also is directed through a gate 252 (FIGURE 32) to produce a high signal on lead PLR (Put Line in Receive). This lead PLR thus sets flop RECA (FIGURE 2) together with CLKA which is generated by PLR (FIGURE 13), and places the terminating unit 14A in "receive" mode. PLR also activates an OR gate 254 (FIGURE 33) to energize lead TOO (Turn Off Oscillator) which resets flop CCA (FIGURE 2) to deenergize the oscillator 46. Thus, the equipment now is conditioned to receive further signals from the teletypewriter 10A.

Figure 39:
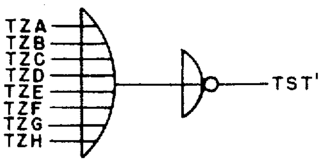
Figure 41:
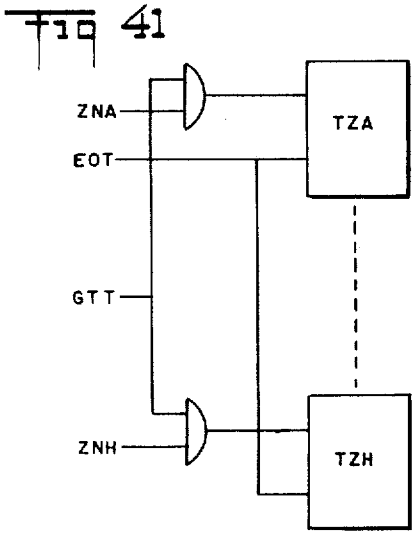
Figure 42:
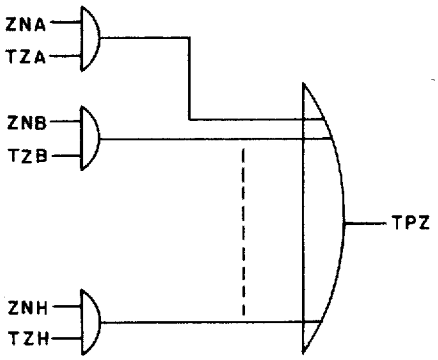

When the operator wishes to transfer the composed message to the central data processor 42, he sends a special operational signal which, in the present embodiment, is "closed bracket" (produced by sending an upper case "L"). This character will be detected by gate 184 (FIGURE 21), providing TST' is high (FIGURE 39, showing that the processor is not working with any other unit), in which case the output GTT will go high. GTT high makes PLS high (FIGURE 22) which activates the terminating unit 14A for a "send" function, as described above, in order to permit the processor to send the teletypewriter a "confirm" or "reject" signal after the message has been fed to the processor and analyzed.

GTT high also sets flip-flop CAF (FIGURE 19) to remove the flag bits from all the message characters and, through gate 190 (FIGURE 8), to insert a flat bit in the assembly section. This conditions the stored data for transmittal out of the delay line, just as in the "verify" mode previously described.

Figure 40:
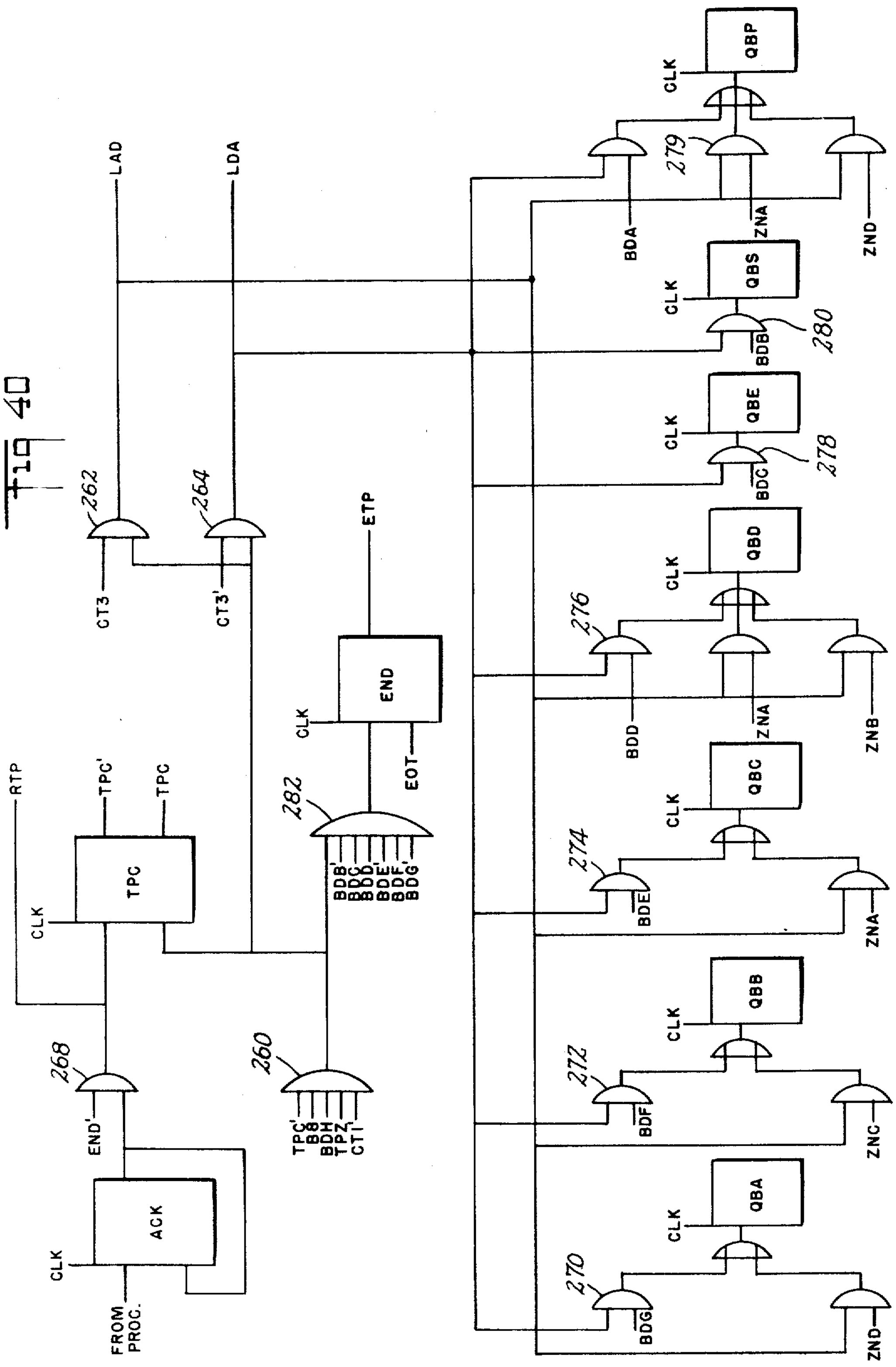

FIGURE 40 shows details of the "input interface" between the message assembler 40 and the data processor 42. This circuitry basically comprises a six-bit register QBA, etc., into which the data bits of each character (including the shift bit from the seventh position) are loaded for dumping into the processor storage. A seventh stage QBP is provided for a parity bit. Typically, the data processor will be capable of sufficiently fast operation that the entire stored message can be transferred in one sweep through the zone of the delay line.

When GTT goes high, it will set one of eight selector flops TZA–TZH (FIGURE 41), depending upon which zone is requesting the data transfer. This will cause TPZ (FIGURE 42) to go high while the delay line is sweeping through that zone.

With TPZ high, a gate 260 (FIGURE 40) will open when BDH goes high at B8, i.e. when the character flag is detected in the shift register 68 (FIGURE 8), providing flop TPC is reset. This latter flop indicates when it is reset that the register QBA, etc., is empty and awaiting transfer of a character to be sent on to the processor. The high output of gate 260 is directed to two AND gates 262 and 264. The first of these opens if the character flag is detected in the assembly section, i.e. while CT3 is high. If so, LAD (Load Address) goes high to cause an address code corresponding to the requesting zone to be loaded into the register QBA, etc. This address code can be generated in any conventional fashion, such as by gating the ZNA, ZNB, etc. signals into selected stages of the register QBA, etc. Since various means known in the art can be employed for performing this function, no details are herein disclosed. The result is that a particular address code is received and stored by the processor 42 so that the processor can thereafter communicate with the corresponding terminating unit 14 and thereby communicate with the corresponding teletypewriter.

When gate 260 goes high it resets flip-flop TPC to show that register QBA, etc., now is full. TPC' goes high to open an AND gate 266 (FIGURE 43) at B7, but after the first two character times. Thus TMF goes high to set flop MVF (FIGURE 18) and shift the flag to the next character section (in this case the first message section) as previously described. After the address code has been transferred, the processor acknowledges its receipt through a flop ACK, the momentary set output of which passes through a gate 268 to set flop TPC. The next time gate 260 goes high, it will open gate 264 to make LDA (Load Data) high. This latter signal opens a series of gates 270–280 to transfer the six data bits of the character stored in shift register 68 (FIGURE 8) to the six register stages QBA, etc. The processor immediately accepts this character, and sends another ACK signal to set up the transfer operation for the next character in the delay line.

These transfer operations continue until the "closed bracket" operational character is reached. When this character is in the shift register 68, and gate 260 is high, another AND gate 282 (FIGURE 40) is opened to set an END flop the set output ETP (End of To Processor) of which goes high.

The processor analyzes the transferred message and, preferably, determines whether it is acceptable. If so, the processor operates to send back to the initiating teletypewriter a "confirm" signal consisting, in this case, of a second "closed bracket," i.e. a teletype character having the 2nd and 5th bits marked. If the message is not acceptable, the processor operates to send back a reject signal, in this case an exclamation point, i.e. a complementary teletype character having the 1st, 3rd and 4th bits marked.

The processor initiates these signals through its control of a TRU flop (not shown) which is set for confirm, and reset for reject. Once this flop has been properly conditioned and the circuitry activated, the transmitting signal lead POS (FIGURE 24) is controlled by an AND gate 284 in such a manner as to generate the "confirm" or "reject" to be sent back to the initiating teletypewriter. This character generation follows the same general procedures previously discussed, in that the particular bit transmitted at any instant is determined by the location of the marker bit in the control characer (it will be recalled that this bit shifts down through the control character each time another bit is sent) and by the conditioning of the TRU flop. Thus, if the message is acceptable, the operator will almost immediately observe another "closed bracket" alongside the first one he typed. If the message is rejected, he will see an exclamation point.

If the message is accepted by the processor 42, and if the message requires that a reply be sent back to the initiating teletypewriter 10A, the processor will load the reply message into one of the two reply zones I and J. The zone address of the initiating teletypewriter which was sent to the processor may be used to set up signals which control the retransmittal of the data from the reply zone to the teletypewriter. During this retransmittal, the circuitry will interrupt any normal message composing operations at the teletypewriter, because the traffic from the processor would have a higher priority. For example, if the processor were to send a reply to teletypewriter 10A, then no operations can take place while the delay line 62 is passing through zone A.

Figure 37:
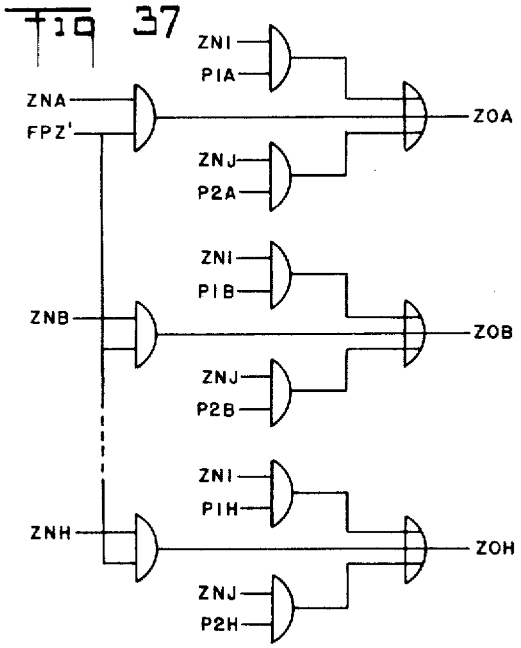
Figure 38:
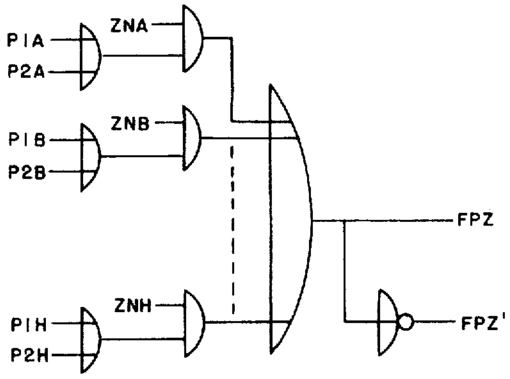
Figure 44:
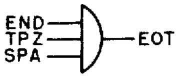
Figure 43:
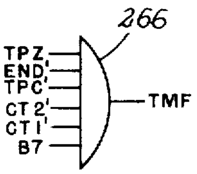

FIGURE 37 shows schematically one arrangement of logic function for achieving this result. In this multiplexing circuitry, ZOA will not go high when ZNA goes high if the processor is transferring data to teletypewriter 10A, since in the latter event FPZ' (From Processor to Zone) would be low while the processor was transmitting data. However, ZOA would go high when Zone I or Zone J is reached, and one of the seeker selectors P1A or P2A is busy, since this would indicate that there is a reply in that zone to be sent back to the teletypewriter.

FIGURE 8*b* shows an AND gate 286 through which the data bits from the processor (FRA) can be loaded into the delay line 62 when the gate is turned on by a control signal FRS. The transfer operations for loading the processor reply into the delay line 62 and for sending these characters back to the initiating teletypewriter follow the same basic principles outlined above with respect to the other data transfer operations of the disclosed equipment. For that reason, and to simplify the presentation herein, no detailed description of the reply transfer arrangement is set forth herein.

Although a specific preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

We claim:

1. A data entry system comprising a central station, a plurality of remote stations connected to said central station and arranged to transmit thereto a variety of messages in the form of a plurality of individual characters each including a number of signal pulses; cyclically operated memory means at said central station defining a storage to hold a series of data bits, said memory means including a plurality of distinct regions each adapted to store a number of data bits; clock means for said memory means; means controlled by said clock means to provide access to the individual bit storage positions in all of said regions; control circuit means responsive to the outputs of said remote stations and arranged to store in said memory means signals corresponding to said messages; said control circuit means including means to store each message in a storage region of said memory means corresponding to the originating remote station, each such region having storage capacity for a plurality of successive characters forming a complete message; data processing means to perform computation operations in response to message signals; and transmission means operable after a complete message of a plurality of characters has been stored in any region of said memory means, said transmission means serving to transmit such complete message to said data processing means for corresponding computation operations.

2. A system according to claim 1, wherein said data processing means is arranged to produce reply signals responsive to each complete message received from any of said remote stations; and means at said central station for storing such reply signals in said memory means for subsequent transmission to the originating remote station.

3. A system as claimed in claim 1, including means at each remote station for selectively initiating the transfer to said data processing means of a stored message received by said central station from the respective remote station.

4. A system as claimed in claim 1, wherein each remote station includes display means arranged to present graphic characters corresponding to the character signals transmitted by the remote station to said central station for storage in said memory means; and means at each remote station for altering the character signals stored in the corresponding region of said memory means by the respective remote station, whereby the operator at the remote station can edit the stored message as presented on the corresponding display means in order to prepare a correctly composed message prior to transfer thereof to said data processing means.

5. A system as claimed in claim 1, including analyzing means responsive to the message signals received from said remote stations and operable to produce control signals indicating the nature of the analyzed character; and operating means responsive to said control signals for controlling the data stored in said memory means.

6. Apparatus as claimed in claim 1, wherein said central station includes means for sending back to any one of said remote stations signals corresponding to a message received from that remote station and stored in said memory means, so that the stored message can be verified for accuracy.

7. Apparatus as claimed in claim 6, wherein each of said remote stations includes means to produce visual symbolic characters corresponding to respective message signals, said character producing means being responsive to the signals transmitted back from said central station to develop a series of visual symbols.

8. Apparatus as claimed in claim 1, including means at said central station for immediately retransmitting each character signal received at said central station to the originating remote station, thereby to permit an immediate detection of error in transmission.

9. Apparatus as claimed in claim 1, wherein said memory means includes a closed-loop delay line means for storing said message characters serially, said delay line being operated at a clock frequency sufficiently high that all of the data is completely recirculated in less time than the duration of one data pulse transmitted by the remote stations.

10. A system as claimed in claim 9, wherein said memory means includes a shift register connected between the output and the input of the delay line to transfer the data bits therebetween at a rate determined by said clock means; and operating circuit means connected to said shift register and arranged to insert data bits in at least one portion thereof.

11. A system as claimed in claim 10, wherein said shift register has a multi-bit capacity sufficient to store at least one complete character, said operating circuit means including means to analyze a character stored in said shift register and to effect logical control operations in accordance with the results of the analysis.

12. Apparatus as claimed in claim 9, wherein each delay line region has a multi-bit section serving as a control character to control the recording of each data bit in one of the message character sections of the region, means for recording a single bit in said control character section to identify the serial position of the data bit currently being received from the respective remote station, and means for shifting said single bit to the next successive position as a data bit is received and stored in said delay line.

13. Apparatus as claimed in claim 9, wherein each region of said delay line means includes an assembly section in which all of the received data bits corresponding to one received character from the respective remote station are initially stored, and means to transfer a complete character from said assembly section to the next available message section in that region.

14. Apparatus as claimed in claim 1, including a plurality of line terminating units each corresponding to one of said remote stations, said terminating units including buffer storage means adapted to store temporarily at least one bit of data from the respective remote station until that data bit can be transferred to said memory means.

15. Apparatus as claimed in claim 14, wherein said buffer storage means includes means to store two bits of data to permit retransmittal of data from said central station to the remote station.

16. Apparatus as claimed in claim 8, wherein said delay line is arranged to include at least one region to store reply messages from said central data processor for subsequent retransmission to any of said remote stations.

17. In a data processing system, a plurality of transmitting stations each including manually-operable data entry means and viewing means for presenting a series of symbolic characters to the eye of an operator, said data entry means serving to produce electrical signals corresponding to the selected manual actuation thereof and also to develop corresponding characters in respective positions on said viewing means; a data receiving and handling station connected to all of said transmitting stations and including memory means; and scanning means at said data handling station for sampling the outputs of all of said remote stations, said scanning means being operable to store the sampled character signals in respective portions of said memory means corresponding to the originating transmitting station, so as to accommodate further processing in accordance with the nature of the stored signals.

18. A data processing system as claimed in claim 17, wherein said data receiving and handling station includes means responsive to the signals of a complete message stored in said memory means and operable to develop and store in said memory means reply signals corresponding to each message received from said transmitting stations, said receiving and handling station further including means to send such reply signals to the originating transmitting station for presentation on said viewing means.

19. Data processing apparatus comprising, in combination, a central data processor including means responsive to permutational signals for developing reply signals, a remote unit having means to develop permutational message signals comprising discrete bits to be sent to said central data processor; a message assembler connected to said remote unit and including a serial recirculating storage means having portions for storing the message signals transmitted from said remote unit, said storage means having additional portions thereof to receive control data bits; means for selectively recording control data bits in said additional portions to identify the storage position of particular message signal elements; and means interconnecting said message assembler with said central data processor to transfer a stored message from said assembler to said processor.

20. Apparatus as claimed in claim 19, including means responsive to said control data bits for controlling the recording of message signal bits subsequently received from the remote unit, thereby to provide that the message signal elements are located in the correct predetermined positions of said storage means.

21. Apparatus as claimed in claim 20, including means automatically operable for shifting a control data bit to a successive position of said additional storage portions upon completion of recording of a message signal element in said storage means, thereby to indicate the storage position of the next message signal element to be recorded.

22. Data processing apparatus comprising, in combination, a central data processor including means responsive to permutation signals for developing reply signals, a plurality of remote units each having means to develop permutational message signals comprising data bits to be sent to said central data processor; a message assembler connected to all of said remote units and including a serial recirculating storage means having separate zones thereof assigned to said remote units respectively for storing the message signals transmitted from said remote units, each of said storage zones including auxiliary storage portions to receive control data bits; means for selectively recording control data bits in said auxiliary portions to identify the storage position of particular message signal elements for the corresponding zones; and means interconnecting said message assembler with said central data processor to transfer stored messages from said assembler to said processor.

23. Apparatus as claimed in claim 22, wherein said storage zones are arranged to provide a plurality of separate character sections each including space for a number of message signal bits and at least one control data bit, and means to control the recording of control data bits in any of said character sections.

24. Apparatus as claimed in claim 23, wherein said storage zones are arranged to provide a plurality of separate multi-bit character sections, one character section in each zone serving as a control section; and means to selectively mark any one bit position in said control section to indicate the storage position of the next data bit to be stored in the data character section being operated on.

25. A data handling system of the type wherein data is presented in graphic symbol form for observation, comprising: a central station and a plurality of remote stations; sending circuit means coupling each of said remote stations to said central station; manually-operable data entry means forming part of each remote station and adapted when actuated to produce signals corresponding to individual characters determined by the selective operation of said data entry means; means at each remote station for directing to the respective sending circuit means pulse-type electrical signals corresponding to said data entry signals; character presentation means forming part of each of said remote stations and including means responsive to electrical signals for developing graphic symbols for viewing by the operator of the remote station; a recirculating memory means at said central station, said memory means being subdivided into a plurality of storage sections each assigned to a respective remote station; scanning means at said central station for sampling all the sending circuits from said remote stations periodically and at a frequency sufficiently high to insure that each pulse developed by a remote station is sampled at least once; control means at said central station responsive to signals sensed by said scanning means and operable to store corresponding data in the memory means section assigned to the originating remote station; and transmission means at the central station for transmitting to the character presentation means at each remote station electrical signals corresponding to data signals stored in the memory means.

26. Apparatus as claimed in claim 25, wherein said transmission means includes means for directing to the character presentation means at any remote station signals derived from the pulse-type electrical signals developed by the data entry means at that remote station and stored in the memory means section assigned to that remote station.

27. Apparatus as claimed in claim 25, wherein said transmission means includes means responsive to signals recirculating through said memory means to produce corresponding signals for the character presentation means at the receiving remote station.

28. Apparatus as claimed in claim 27, including data processing means coupled to said central station to receive query signals corresponding to messages assembled at said central station; said memory means including portions arranged to store data corresponding to answer messages developed by said data processing means to be sent on to the quering remote station by said transmission means.

29. A data presentation system comprising a central station and a plurality of remote stations; individual circuits coupling said remote stations to said central station; a character presentation device at each remote station responsive to electrical signals to develop graphic symbols for viewing at the remote station; a recirculating memory device at the central station, said memory device including storage sections assigned to respective remote stations; control means at said central station for developing and storing in said memory device data signals identifying particular characters, said control means including means to store the data signals in the memory device section assigned to the respective remote station; and transmission means at the central station for directing to the character presentation means at any remote station electrical signals corresponding to the data signals stored in the respective memory device section by said control means.

30. A data presentation system comprising a central station having a recirculating delay line memory device adapted to store a sequential series of data bits; a plurality of remote stations each having character presentation means responsive to electrical signals for developing graphic character symbols for viewing; individual circuit means connecting each of said remote stations to said central station; control means at said central station for controlling the storage and recirculation of the data bits in said delay line, said control means including means for developing and storing in said delay line data signals representing characters to be presented at a selected remote station and for identifying the remote station to which any particular group of data signals is to be sent; and transmission means jointly responsive to said control means and to the data bits produced at the output of said delay line as a result of the recirculation of the delay line bits, said transmission means including means for producing electrical signals corresponding to said data signals and for directing said electrical signals to the character presentation means of the identified remote station at which corresponding characters are to be displayed.

31. A data handling system comprising a central station and a plurality of remote stations coupled thereto by individual circuits; a recirculating delay line storage device at said central station adapted to store a sequential series of data bits and to recirculate the stored bits continuously, said delay line being sub-divided into a group of storage sections each assigned to a respective remote station to carry data bits for that remote station, each storage section being further sub-divided into a group of character slots comprising a set of character bits and at least one flag bit position; control means at said central station for developing and storing in said delay line character bit signals identifying characters for the remote station assigned to that section of the delay line, said control means being arranged to insert the data bits for any given character in a corresponding slot of the section; slot-identifying means at said central station for inserting marked bits in the flag bit positions of the character slots, said slot-identifying means including means responsive to the insertion of a set of character bits in a character slot and operable to place a marked bit in the flag bit position of the next unoccupied slot in the sequence, thereby to identify the place where the next set of character bits is to be inserted; said control means including means responsive to the detection of a marked flag bit to initiate the insertion of the character bits in the identified slot.

32. A data handling system comprising first and second stations; circuit means coupling said stations together; a recirculating delay line storage device at said first station adapted to store a sequential series of data bits and to recirculate the stored bits continuously, said delay line including at least one storage section divided into a group of character slots each comprising a set of character bit positions and at least one flag bit position; control means at said first station for developing and storing in said delay line character bit signals identifying characters to be transmitted to said second station, said control means being arranged to insert the data bits for any given character in a corresponding slot of said section; slot-identifying means at said first station for inserting marked bits in the flag bit positions of the character slots, said slot-identifying means including means responsive to the insertion of a set of character bits in a character slot and operable to place a marked bit in the flag bit position of the next unoccupied slot in a predetermined sequence, thereby to identify the place where the next set of character bits is to be inserted; said control means including means responsive to the detection of a marked flag bit to initiate the insertion of the character bits in the identified slot.

33. A data processing system comprising: a central station and a plurality of remote stations; sending circuit means coupling each of said remote stations to said central station; manually-operable data entry means forming part of each remote station and adapted when actuated to produce signals corresponding to individual characters determined by the selective operation of said data entry means; means at each remote station for directing to the respective sending circuit means pulse-type electrical signals corresponding to said data entry signals; character presentation means forming part of each of said remote stations and including means responsive to electrical signals for developing graphic symbols for viewing by the operator of the remote station; memory means at said central station, said memory means being sub-divided into a plurality of storage sections each assigned to a respective remote station; scanning means at said central station for sampling all the sending circuits from said remote stations periodically and at a frequency sufficiently high to insure that each pulse developed by a remote station is sampled at least once; control means at said central station responsive to signals sensed by said scanning means and operable to store corresponding data in the memory means section assigned to the originating remote station; means for directing to the character presentation means at each remote station electrical signals corersponding to the signals sent from the respective remote station to the memory means at said central station, whereby to develop corresponding graphic symbols representing a composed message for inspection by the operator at that remote station; and transfer means at said central station under the control of signals sent from said remote stations, said transfer means being operable after a complete message has been assembled in any section of said memory means to direct corresponding message signals to a data processor for subsequent operations.

References Cited

UNITED STATES PATENTS 3,087,010 4/1963 De Turk et al. ________ 178—23

OTHER REFERENCES

Schellenberg, "TCM: A Large Capacity Terminal-to-Computer Multiplexor for Low-Speed Terminals," IEEE Conference Paper No. CP 63–623 CD–1.

THOMAS A. ROBINSON, *Primary Examiner.*